US010593926B2

(12) United States Patent
Maeda et al.

(10) Patent No.: US 10,593,926 B2
(45) Date of Patent: Mar. 17, 2020

(54) ENERGY STORAGE DEVICE INCLUDING A RIGIDITY CHANGING PART DISPOSED IN A VICINITY OF A JOINT PORTION OF A FIRST MEMBER AND A SECOND MEMBER

(71) Applicant: GS Yuasa International Ltd., Kyoto-shi (JP)

(72) Inventors: Kazuto Maeda, Kyoto (JP); Hirokazu Kambayashi, Kyoto (JP); Shohei Yamao, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 106 days.

(21) Appl. No.: 15/495,377

(22) Filed: Apr. 24, 2017

(65) Prior Publication Data

US 2017/0309885 A1      Oct. 26, 2017

(30) Foreign Application Priority Data

Apr. 25, 2016   (JP) ................................. 2016-087483
Mar. 2, 2017    (JP) ................................. 2017-039451

(51) Int. Cl.
   *H01M 2/26*       (2006.01)
   *H01M 2/22*       (2006.01)
   (Continued)

(52) U.S. Cl.
   CPC ............... *H01M 2/26* (2013.01); *H01M 2/22* (2013.01); *H01M 2/263* (2013.01); *H01M 10/0431* (2013.01); *H01M 10/0525* (2013.01)

(58) Field of Classification Search
   CPC .......... H01M 2/22; H01M 2/26; H01M 2/263; H01M 10/0431
   See application file for complete search history.

(56) References Cited

U.S. PATENT DOCUMENTS 5,305,517 A * 4/1994 Schleicher ........... B21D 39/031
                                                29/243.53
2011/0076552 A1   3/2011 Taniguchi et al.
              (Continued)

FOREIGN PATENT DOCUMENTS

JP    2001-338632 A    12/2001
JP    2004-273178 A     9/2004
              (Continued)

OTHER PUBLICATIONS

Machine translation for Nishioka et al., JP 2004-273178 A. (Year: 2019).*

*Primary Examiner* — Rena Dye Cronin
(74) *Attorney, Agent, or Firm* — McGinn I. P. Law Group, PLLC.

(57) ABSTRACT

An energy storage device includes a positive electrode current collector and a negative electrode current collector which respectively have electric conductivity and are joined to each other, and cover members. The energy storage device includes swaged joint portions which join the positive electrode current collector and the cover members to each other, and are engaged with each other by fitting engagement by a concavo-convex fitting engagement structure which projects from the positive electrode current collector toward the cover members, and swaged joint portions which join the negative electrode current collector and the cover members to each other and, are engaged with each other by fitting engagement by a concavo-convex fitting engagement structure which projects from the negative electrode current collector toward the cover members. The cover members respectively include a strip-shaped projection which forms a rigidity changing part on the side of the swaged joint portion.

11 Claims, 15 Drawing Sheets

(51) Int. Cl.
*H01M 10/04* (2006.01)
*H01M 10/0525* (2010.01)

(56) References Cited

U.S. PATENT DOCUMENTS

| | | | | |
|---|---|---|---|---|
| 2011/0123855 A1* | 5/2011 | Kim | ................... | H01M 2/0212 |
| | | | | 429/179 |
| 2012/0219845 A1* | 8/2012 | Chiba | ................... | H01M 2/266 |
| | | | | 429/153 |

FOREIGN PATENT DOCUMENTS

| | | | |
|---|---|---|---|
| JP | 2004273178 A | * | 9/2004 |
| JP | 2011-060672 A | | 3/2011 |
| JP | 2011-076867 A | | 4/2011 |
| JP | 2015-005456 A | | 1/2015 |
| JP | 2015-032441 A | | 2/2015 |
| JP | 2015-106501 A | | 6/2015 |
| JP | 2017-004646 A | | 1/2017 |

* cited by examiner

ENERGY STORAGE DEVICE INCLUDING A RIGIDITY CHANGING PART DISPOSED IN A VICINITY OF A JOINT PORTION OF A FIRST MEMBER AND A SECOND MEMBER

CROSS-REFERENCE TO RELATED APPLICATION

This application claims the benefit of Japanese patent applications No. 2016-087483 filed on Apr. 25, 2016 and No. 2017-039451 filed on Mar. 2, 2017, which are incorporated by reference.

FIELD

The present invention relates to an energy storage device which includes an electrode assembly.

BACKGROUND

As an energy storage device such as a lithium ion secondary battery, there has been known an energy storage device which includes an electrode assembly formed by overlapping a positive electrode plate, a negative electrode plate, and a sheet-like separator having an electric insulation property. For example, JP 2004-273178 A (patent literature 1) describes an energy storage device which includes an electrode assembly formed of a winding electrode. The winding electrode is formed by stacking and winding a set formed of an elongated insulation sheet, an elongated positive electrode sheet, an elongated insulation sheet and an elongated negative electrode sheet. In the winding electrode, a positive electrode foil of the positive electrode sheet, which projects from one long side of the insulation sheet, is stacked, and a negative electrode foil of the negative electrode sheet, which projects from the other long side of the insulation sheet, is stacked. The stacked positive electrode foil is joined to plate portions of a positive electrode terminal which sandwich the stacked positive electrode foil from both sides. The stacked negative electrode foil is joined to plate portions of a negative electrode terminal which sandwich the stacked negative electrode foil from both sides. In performing the joining, two plate portions which sandwich the electrode foil therebetween are plastically deformed such that one plate portion and the positive electrode foil or the negative electrode foil are sunk into the other plate portion.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In recent years, an energy storage device (like one described in patent literature 1) is mounted on a movable body such as an automobile. During the movement of the movable body, the energy storage device and the winding electrode receive vibrations from the movable body. Accordingly, connecting portions between the winding electrode and the positive electrode terminal and the negative electrode terminal also receive vibrations. Since the connecting portions between the winding electrode and the positive electrode terminal and the negative electrode terminal are electrically conductive portions, the connecting portions are required to ensure reliability of the connection such that the connection can be maintained even after the connecting portions receive vibrations or the like. That is, improvement of quality of the connecting portions is required.

An object of the present invention is to provide an energy storage device which can realize the enhancement of quality of a connecting portion between electrically conductive members.

An energy storage device according to an aspect of the present invention includes a first member and a second member having electric conductivity and joined to each other, wherein the energy storage device includes joint portion which joins the first member and the second member to each other, the joint portion being engaged with each other by fitting engagement by a concavo-convex structure which projects from the first member toward the second member, and at least one of the first member and the second member includes a rigidity changing part in a vicinity of the joint portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
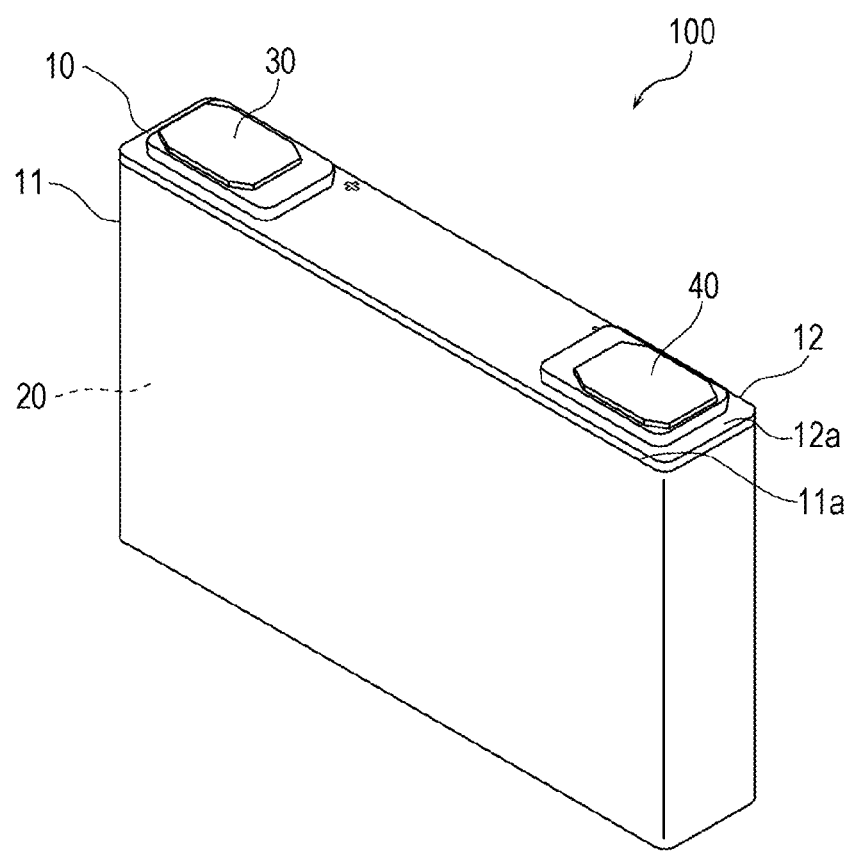
FIG. 1 is a perspective view schematically showing an external appearance of an energy storage device according to an embodiment of the present invention.

An energy storage device according to an aspect of the present invention includes a first member and a second member having electric conductivity and joined to each other, wherein the energy storage device includes joint portion which joins the first member and the second member to each other, the joint portion being engaged with each other by fitting engagement by a concavo-convex structure which projects from the first member toward the second member, and at least one of the first member and the second member includes a rigidity changing part on a side of the joint portion.

The rigidity changing part may include a strip-shaped projection projecting from a surface in the vicinity of the joint portion of at least one of the first member and the second member.

The rigidity changing part may include a strip-shaped recessed portion recessed from a surface in the vicinity of the joint portion of at least one of the first member and the second member.

The strip-shaped recessed portion may be positioned on a side opposite to the projection formed on at least one of the first member and the second member, and may extend along the projection.

In the joint portion, both the first member and the second member may project in a direction from the first member toward the second member, and may be recessed in a direction from the first member toward the second member.

An electrode plate may be sandwiched between the first member and the second member.

The first member may be a current collector, the second member may be a cover member of the electrode plate, and a thickness of the second member may be smaller than a thickness of the first member.

According to the energy storage device, quality of the connecting portion between the electrically conductive members can be enhanced.

Hereinafter, an energy storage device according to an embodiment of the present invention is described with reference to drawings. The embodiment described hereinafter relates to a comprehensive and specific example of the present invention. However, numerical values, shapes, materials, constitutional elements, arrangement positions and connections modes of the constitutional elements and the like described in the embodiment hereinafter are only examples and are not intended to be used for limiting the present invention. Among the constitutional elements in the embodiments described hereinafter, the constitutional elements which are not described in independent claims which describe uppermost concepts are described as arbitrary constitutional elements.

The respective views in the attached drawings are schematic views and are not necessarily strictly described in an actual scale. In the respective drawings, the identical or the substantially identical constitutional elements are given the same symbols. Further, in the description of the embodiments made hereinafter, there may be a case where the expression which is affixed with "substantially" such as "substantially parallel" or "substantially orthogonal" is used. For example, "substantially parallel" means not only "completely parallel" but also "substantially parallel". That is, "substantially" includes a difference of several percentage, for example. The same goes for other expressions which are affixed with "substantially".

Embodiment

A configuration of an energy storage device 100 according to an embodiment is described. FIG. 1 is a perspective view schematically showing an external appearance of the energy storage device 100 according to the embodiment. As shown in FIG. 1, the energy storage device 100 has a flat rectangular parallelepiped external shape. The energy storage device 100 is a chargeable and dischargeable secondary battery. For example, the energy storage device 100 is a non-aqueous electrolyte secondary battery such as a lithium ion secondary battery. However, the energy storage device 100 is not limited to the non-aqueous electrolyte secondary battery and may be a secondary battery other than the non-aqueous electrolyte secondary battery, may be a primary battery which can provide stored electricity even when a user does not charge, or may be a capacitor.

Figure 2:
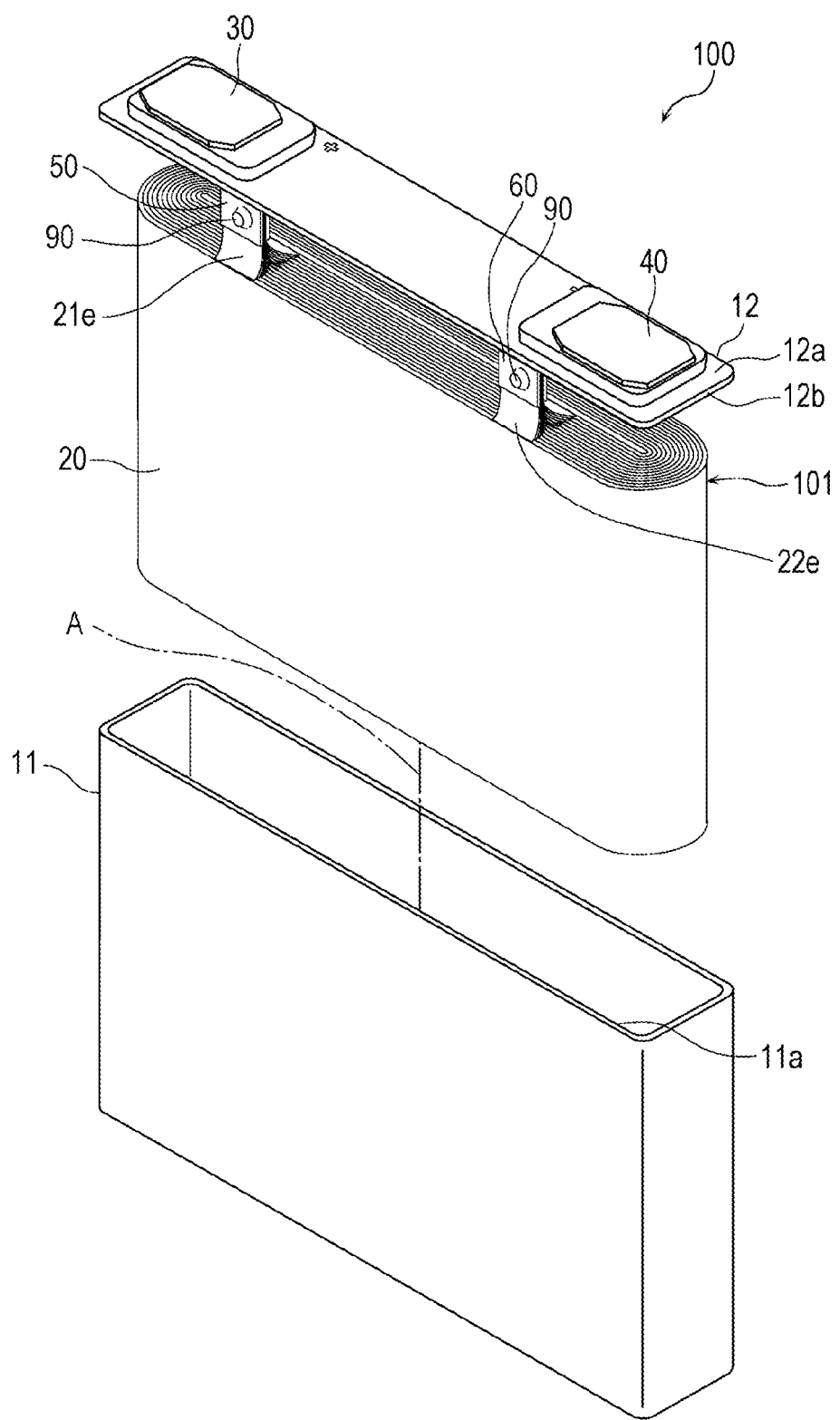
FIG. 2 is an exploded perspective view of the energy storage device shown in FIG. 1 and showing a state where an assembly formed of a lid body of a container and an electrode assembly is separated from a container body of the container.
Figure 3:
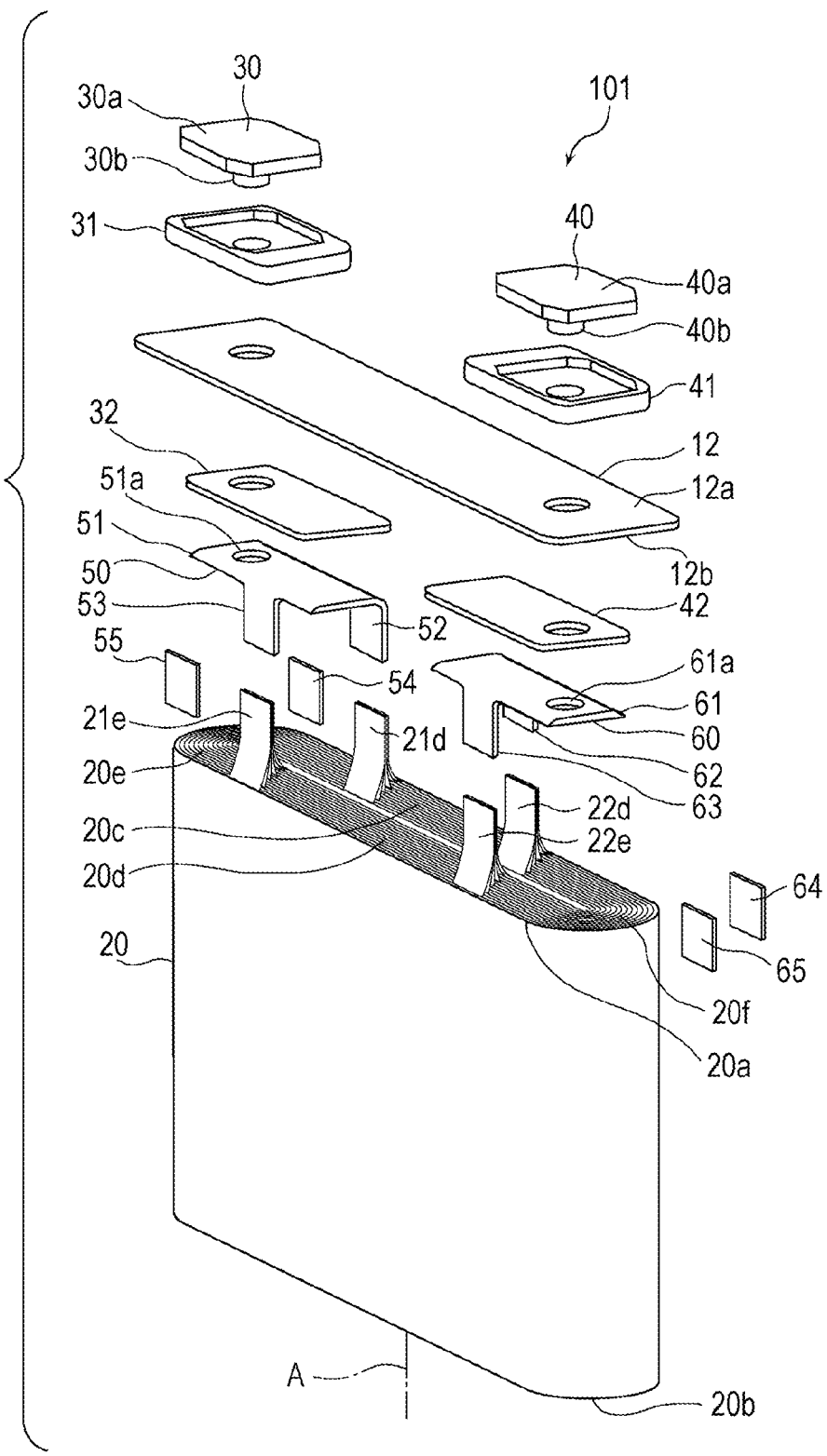
FIG. 3 is an exploded perspective view showing the assembly formed of the lid body and the electrode assembly shown in FIG. 2 in an exploded manner.

With reference to FIG. 1, FIG. 2 and FIG. 3, the energy storage device 100 includes: a flat rectangular parallelepiped container 10; an electrode assembly 20 housed in the container 10; and a positive electrode terminal 30 and a negative electrode terminal 40. FIG. 2 is an exploded perspective view of the energy storage device 100 in FIG. 1, and is a view showing a state where an assembly 101 formed of a lid body 12 of the container 10 and the electrode assembly 20 is separated from a container body 11 of the container 10. FIG. 3 is an exploded perspective view showing the assembly 101 formed of the lid body 12 and the electrode assembly 20 shown in FIG. 2 in an exploded manner.

The container 10 includes: the container body 11 having a bottomed square cylindrical shape; and the lid body 12 having an elongated rectangular plate shape which can close an opening portion 11a of the container body 11, the opening portion 11a having an elongated rectangular shape. The container body 11 has a flat rectangular parallelepiped external shape. The positive electrode terminal 30 and the negative electrode terminal 40 are disposed on an outer surface 12a of the lid body 12. In the container 10, an electrolyte such as an electrolytic solution (in this embodiment, non-aqueous electrolytic solution) is sealed together with the electrode assembly 20. However, the illustration of the electrolyte is omitted. A kind of the electrolyte is not particularly limited and various kinds of electrolytes can be selected as the electrolyte to be sealed in the container 10 provided that the electrolyte does not deteriorate the performance of the energy storage device 100.

The container body 11 and the lid body 12 are fixed to each other such that a joint portion therebetween is brought into an air-tightly sealed state by a joining method such as welding. With such a configuration, a sealed space is formed in the container 10. The container body 11 and the lid body 12 may be made of weldable metal such as stainless steel, aluminum or an aluminum alloy, for example, although not limited to such materials. In the energy storage device 100, a constitutional element which houses the electrode assembly 20 therein may not have high rigidity and strength as the container 10 has. For example, the electrode assembly 20 may be housed in a film-like or a sheet-like exterior body having flexibility. The energy storage device may include such an exterior body as the container, and such an energy storage device is also referred to as a laminate-type energy storage device.

The positive electrode terminal 30 and the negative electrode terminal 40 which have conductivity penetrate the lid body 12, project from an inner surface 12b of the lid body 12 on a side opposite to the outer surface 12a of the lid body 12, and are connected to a positive electrode current collector 50 and a negative electrode current collector 60 on the above-mentioned opposite side and having conductivity. The positive electrode current collector 50 and the negative electrode current collector 60 are further connected to the electrode assembly 20. In this embodiment, the positive electrode current collector 50 and the negative electrode current collector 60 are examples of the first member.

A plate-like upper insulating member 31 is disposed between the positive electrode terminal 30 and the lid body 12 so as to electrically insulate the positive electrode terminal 30 and the lid body 12 from each other, and a plate-like lower insulating member 32 is disposed between the lid body 12 and the positive electrode current collector 50 so as to electrically insulate the lid body 12 and the positive electrode current collector 50 from each other. A plate-like upper insulating member 41 is disposed between the negative electrode terminal 40 and the lid body 12 so as to insulate the negative electrode terminal 40 and the lid body 12 from each other, and a plate-like lower insulating member 42 is disposed between the lid body 12 and the negative electrode current collector 60 so as to insulate the lid body 12 and the negative electrode current collector 60 from each other. The insulating members 31, 32, 41 and 42 are made of a material having an electrically insulating property such as a resin, and are formed of a gasket made of polyphenylene sulfide (PPS), polyether ether ketone (PEEK), polypropylene (PP), tetrafluoroethylene-perfluoroalkyl vinyl ether copolymer (PFA) or the like, for example.

The electrode assembly 20 is provided in a suspended manner from the lid body 12 by way of the positive electrode current collector 50 and the negative electrode current collector 60. The electrode assembly 20 is housed in the container body 11 together with the positive electrode current collector 50 and the negative electrode current collector 60. There may be a case where the electrode assembly 20 is covered by an insulation film for electrically insulating the electrode assembly 20 and the container body 11 from each other. There may be also a case where a buffer member such as a spacer is provided between the electrode assembly 20 and the container body 11.

Figure 4:
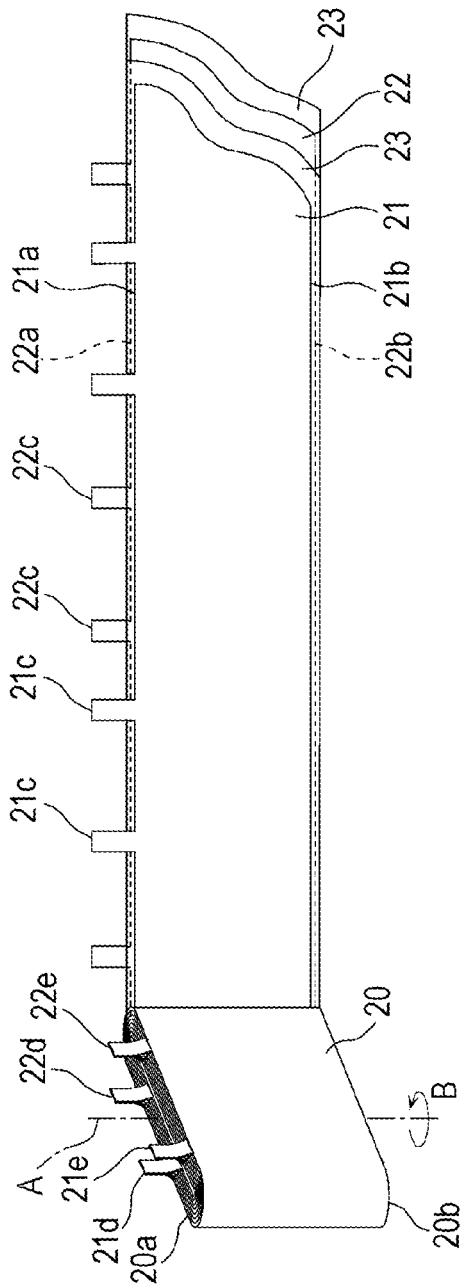
FIG. 4 is a perspective view of the electrode assembly showing a portion of the electrode assembly shown in FIG. 3 in a developed manner.

The configuration of the electrode assembly 20 is described with reference to FIG. 3 and FIG. 4. FIG. 4 is a perspective view of the electrode assembly 20 showing a portion of the electrode assembly 20 shown in FIG. 3 in a developed manner. The electrode assembly 20 is an energy storage element (also referred to as a power generation element) which can store electricity therein. The electrode assembly 20 includes: a sheet-like positive electrode plate 21 having an elongated rectangular strip-shaped planar shape; a sheet-like negative electrode plate 22 having an elongated rectangular strip-shaped planar shape; and two sheet-like separators 23 each having an elongated rectangular strip-shaped planar shape, wherein the positive electrode plate 21, the negative electrode plate 22 and the separators 23 are stacked with each other in a layered manner.

The electrode assembly 20 is configured such that one separator 23, the negative electrode plate 22, the other separator 23, and the positive electrode plate 21 are made to overlap with each other in a layered manner in this order, and are wound together in a multi-layered spiral shape in a winding direction B shown in FIG. 4 about a winding axis A. The winding axis A is an imaginary axis indicated by a chain line in FIG. 3 and FIG. 4, and the electrode assembly 20 has a configuration substantially symmetrical with respect to the winding axis A. In this embodiment, the electrode assembly 20, having a cross section perpendicular to the winding axis A of a flat elongated circular shape, has a flat elongated circular external shape although not limited to such a shape. However, a cross-sectional shape of the electrode assembly 20 may be a shape other than an elongated circular shape, that is, may be a circular shape, an elliptical shape, a rectangular shape, and other polygonal shape.

The positive electrode plate 21 includes: a positive electrode base material which is an elongated rectangular strip-shaped metal foil made of metal such as aluminum or an aluminum alloy; and positive active material layers which are formed on the substantially whole wide main surfaces on both sides of the positive electrode base material by a coating method or the like. The negative electrode plate 22 includes: a negative electrode base material which is an elongated rectangular strip-shaped metal foil made of metal such as copper or a copper alloy; and negative active material layers which are formed on the substantially whole wide main surfaces on both sides of the negative electrode base material by a coating method or the like. As the positive active material used for forming the positive active material layer or the negative active material used for forming the negative active material layer, a known material can be used provided that the positive active material or the negative active material can occlude and discharge lithium ions. In this embodiment, the positive active material layer and the negative active material layer are formed on the main surfaces on both sides of the positive electrode base material and the negative electrode base material. However, the positive active material layer and the negative active material layer may be formed on the main surface on only one side of the positive electrode base material and the negative electrode base material. The separator 23 is formed using a microporous sheet made of a material having an electrically insulating property such as a resin.

Among two edges 21a and 21b extending along a longitudinal direction of the positive electrode plate 21, on one edge 21a, a plurality of positive electrode current collecting tabs 21c each having a rectangular foil shape are formed in a projecting manner. The positive electrode current collecting tabs 21c extend integrally and continuously from the positive electrode base material and form portions of the positive electrode base material. The positive electrode current collecting tab 21c is made of the same material as the positive electrode base material, and a positive active material layer is not formed on the positive electrode current collecting tab 21c. In this embodiment, two positive electrode current collecting tabs 21c are disposed per one winding of the positive electrode plate 21 in the electrode assembly 20. In the electrode assembly 20, after being wound, the plurality of positive electrode current collecting tabs 21c are positioned collectively at two places thus forming positive electrode current collecting tab groups 21d, 21e at respective places. In each of the positive electrode current collecting tab groups 21d, 21e, the positive electrode current collecting tabs 21c are positioned in substantially one row in a stacking direction of the multi-layered structure formed by the positive electrode plate 21, the negative electrode plate 22 and the separators 23 which are wound around each other.

Among two edges 22a and 22b extending along a longitudinal direction of the negative electrode plate 22, on one edge 22a, a plurality of negative electrode current collecting tabs 22c each having a rectangular foil shape are formed in a projecting manner. The negative electrode current collecting tab 22c extends integrally and continuously from the negative electrode base material and forms a portion of the negative electrode base material. The negative electrode current collecting tab 22c is made of the same material as the negative electrode base material, and a negative active material layer is not formed on the negative electrode current collecting tab 22c. In this embodiment, two negative electrode current collecting tabs 22c are disposed per one winding of the negative electrode plate 22 in the electrode assembly 20. In the electrode assembly 20, after being wound, the plurality of negative electrode current collecting tabs 22c are positioned collectively at two places thus forming negative electrode current collecting tab groups 22d, 22e at respective places. In each of the negative electrode current collecting tab groups 22d, 22e, the negative electrode current collecting tabs 22c are positioned in substantially one row in the stacking direction of the positive electrode plate 21, the negative electrode plate 22 and the separators 23 which are wound around each other.

The number of positive electrode current collecting tabs 21c disposed per one winding of the positive electrode plate 21 and the number of negative electrode current collecting tab 22c disposed per one winding of the negative electrode plate 22 are not limited to two. In this embodiment, the positive electrode current collecting tab 21c and the negative electrode current collecting tab 22c each has a rectangular planar shape. However, the positive electrode current collecting tab 21c and the negative electrode current collecting tab 22c may have any shape.

The positive electrode plate 21 and the negative electrode plate 22 are made to overlap with each other for winding in a state where longitudinal direction of the positive electrode plate 21 and the longitudinal direction of the negative electrode plate 22 are equal. In such a configuration, the positive electrode current collecting tabs 21c and the negative electrode current collecting tabs 22c are disposed on the same side with respect to overlapping portions of the positive electrode plate 21 and the negative electrode plate 22. That is, the edge 21a of the positive electrode plate 21 and the edge 22a of the negative electrode plate 22 are positioned adjacently to each other, and an edge 21b of the positive electrode plate 21 and an edge 22b of the negative electrode plate 22 are positioned adjacently to each other.

Two separators 23 are disposed on the flat main surfaces on both sides of one negative electrode plate 22. One separator 23 is disposed adjacently to the negative electrode plate 22 at the outer side of the negative electrode plate 22 at the time of winding, and the other separator 23 is disposed adjacently to the negative electrode plate 22 at the inner side of the negative electrode plate 22 at the time of winding. The whole negative electrode plate 22 except for the negative electrode current collecting tabs 22c is covered by two separators 23. In such a configuration, the negative electrode current collecting tabs 22c pass through between two separators 23 and project from the separators 23.

One positive electrode plate 21 is disposed on the separator 23 in an overlapping manner so as to be at the inner side of the separator 23 which is disposed adjacently to the negative electrode plate 22 at the inner side of the negative electrode plate 22 at the time of winding. In such a configuration, except for the positive electrode current collecting tabs 21c, the whole positive electrode plate 21 is covered by the negative electrode plate 22 and two separators 23, and faces the negative electrode plate 22. The positive electrode current collecting tabs 21c project from two separators 23.

In a state where one positive electrode plate 21, one negative electrode plate 22 and two separators 23 which are stacked each other as described above are made to overlap with each other, these constitutional elements are wound around in a spiral shape in the winding direction B about the winding axis A thus forming the electrode assembly 20. In the electrode assembly 20 after being wound, the edge 21a of the stacked positive electrode plate 21 and the edge 22a of the stacked negative electrode plate 22 are disposed in a coplanar shape thus forming an end portion 20a of the electrode assembly 20 in the direction of the winding axis A. The edge 21b of the stacked positive electrode plate 21 and the edge 22b of the stacked negative electrode plate 22 are disposed in a coplanar shape thus forming an end portion 20b of the electrode assembly 20 in the direction of the winding axis A. The end portions 20a, 20b extend substantially orthogonal to the winding axis A.

Further, in the electrode assembly 20 after being wound, the positive electrode plate 21, the negative electrode plate 22, and the separators 23 which are stacked with each other form a wall-like body extending along the winding direction B. To be more specific, the wall-like body is formed of two flat-wall-like portions 20c, 20d which are disposed to face each other with the winding axis A sandwiched therebetween and are flat and wide; and two bent-wall-like portions 20e, 20f which are disposed to face each other with the winding axis A sandwiched therebetween and are bent in a semicircular shape respectively. The flat-wall-like portions 20c, 20d extend substantially parallel to each other. The bent-wall-like portions 20e, 20f connect the flat-wall-like portions 20c, 20d to each other at both ends of the flat-wall-like portions 20c, 20d respectively.

Figure 5:
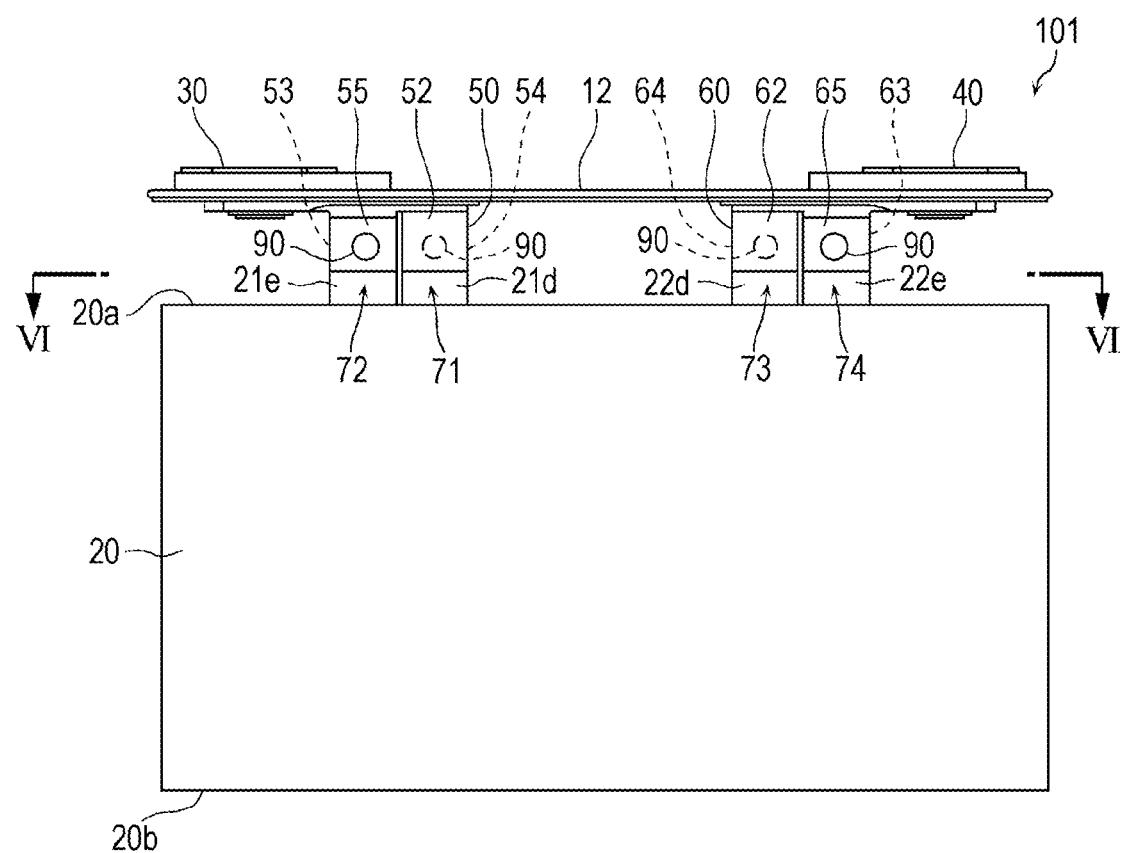
FIG. 5 is a side view of the assembly formed of the lid body and the electrode assembly shown in FIG. 2 as viewed from a side.
Figure 6:
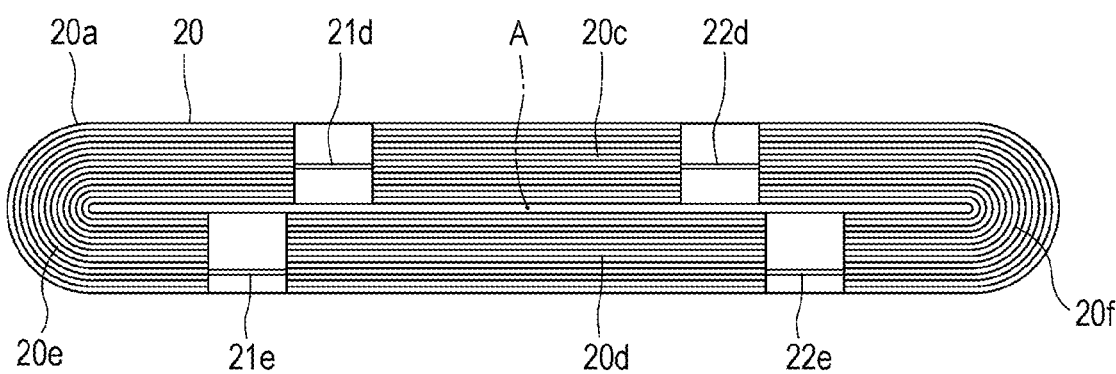
FIG. 6 is a plan view of the electrode assembly when the electrode assembly is viewed from a plane taken along line VI-VI shown in FIG. 5.

With reference to FIG. 3, FIG. 4, FIG. 5 and FIG. 6, in this embodiment, the positive electrode current collecting tab group 21d and the negative electrode current collecting tab group 22d are disposed on the end portion 20a of the flat-wall-like portion 20c, and the positive electrode current collecting tab group 21e and the negative electrode current collecting tab group 22e are disposed on the end portion 20a of the flat-wall-like portion 20d. FIG. 5 is a side view of the assembly 101 formed of the lid body 12 and the electrode assembly 20 shown in FIG. 2 as viewed from the side of the assembly 101. FIG. 6 is a plan view of the electrode assembly 20 when the electrode assembly 20 is viewed from a plane taken along line VI-VI in FIG. 5.

The positive electrode current collecting tab groups 21d, 21e are disposed between the winding axis A positioned at the center of the electrode assembly 20 and the bent-wall-like portion 20e in a direction along the flat-wall-like portions 20c, 20d. The positive electrode current collecting tab group 21d is disposed closer to the winding axis A in the direction along the flat-wall-like portions 20c, 20d than the positive electrode current collecting tab group 21e is. That is, the positive electrode current collecting tab group 21d is disposed away from the bent-wall-like portion 20e. Accordingly, the positive electrode current collecting tab groups 21d, 21e are disposed at positions displaced from each other in the direction along the flat-wall-like portions 20c, 20d which is also a direction along the winding direction of the electrode assembly 20. In this embodiment, the positive electrode current collecting tab groups 21d, 21e are disposed such that, when the electrode assembly 20 is viewed in a direction from the flat-wall-like portion 20d toward the flat-wall-like portion 20c, that is, in a stacking direction of the positive electrode current collecting tabs 21c in the positive electrode current collecting tab groups 21d, 21e, the positive electrode current collecting tab groups 21d, 21e do not overlap with each other. The positive electrode current collecting tab groups 21d, 21e may be disposed in a partially overlapping manner. The positive electrode current collecting tab groups 21d, 21e may be positioned at the bent-wall-like portion 20e, and may be positioned between the winding axis A and the bent-wall-like portion 20f.

The negative electrode current collecting tab groups 22d, 22e are disposed between the winding axis A and the bent-wall-like portion 20f in a direction along the flat-wall-like portions 20c, 20d. The negative electrode current collecting tab group 22d is disposed closer to the winding axis A in the direction along the flat-wall-like portions 20c, 20d than the negative electrode current collecting tab group 22e is. That is, the negative electrode current collecting tab group 22d is disposed away from the bent-wall-like portion 20f. Accordingly, the negative electrode current collecting tab groups 22d, 22e are disposed at positions displaced from each other in the direction along the flat-wall-like portions 20c, 20d. In this embodiment, the negative electrode current collecting tab groups 22d, 22e are disposed such that, when the electrode assembly 20 is viewed in a direction from the flat-wall-like portion 20d toward the flat-wall-like portion 20c, that is, in a stacking direction of the negative electrode current collecting tabs 22c in the negative electrode current collecting tab groups 22d, 22e, the negative electrode current collecting tab groups 22d, 22e do not overlap with each other. The negative electrode current collecting tab groups 22d, 22e may be disposed in a partially overlapping manner. Further, the negative electrode current collecting tab groups 22d, 22e may be positioned at the bent-wall-like portion 20f, and may be positioned between the winding axis A and the bent-wall-like portion 20f. That is, the arrangement of the positive electrode current collecting tab groups 21d, 21e and the arrangement of the negative electrode current collecting tab groups 22d, 22e are not limited to the above-mentioned arrangement.

With reference to FIG. 2 and FIG. 3, the positive electrode current collecting tab groups 21d, 21e are connected to the positive electrode current collector 50, and the negative electrode current collecting tab groups 22d, 22e are connected to the negative electrode current collector 60. The positive electrode current collector 50 may be made of substantially the same material as the positive electrode base material of the positive electrode plate 21 of the electrode assembly 20. The negative electrode current collector 60 may be made of substantially the same material as the negative electrode base material of the negative electrode plate 22 of the electrode assembly 20.

Figure 7:
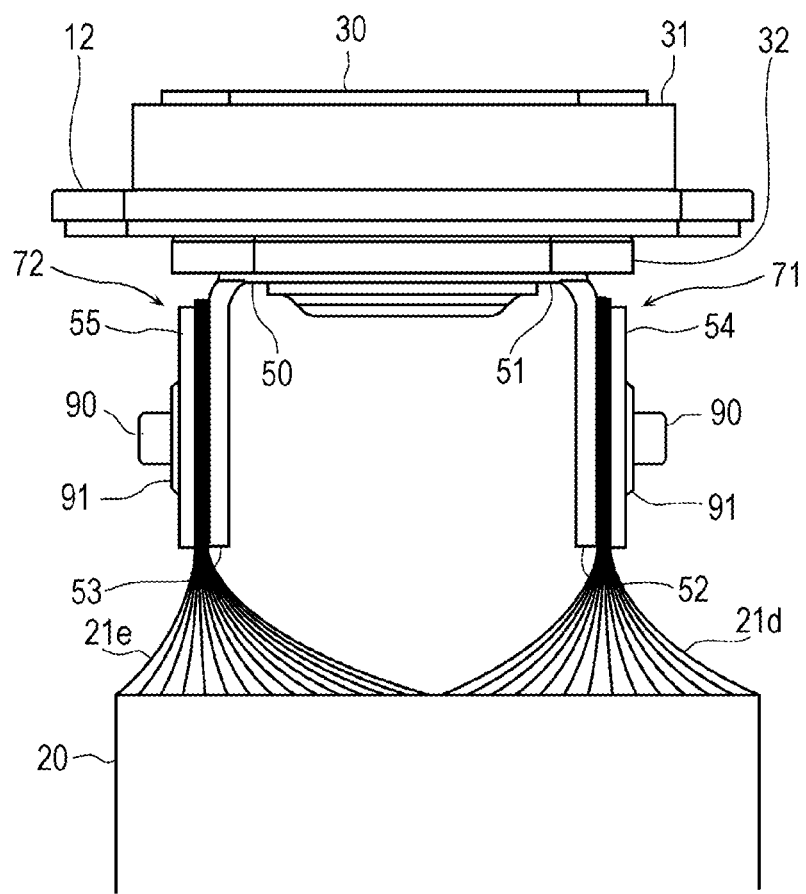
FIG. 7 is a view showing joint portions between positive electrode current collecting tab groups of the electrode assembly and the positive electrode current collector shown in FIG. 5 in an enlarged manner and is also a view of the joint portions as viewed in a direction from a negative electrode terminal toward a positive electrode terminal.

With reference to FIG. 3, FIG. 5 and FIG. 7, the positive electrode current collector 50 is an integral body which is integrally formed by a first connecting portion 51 having a rectangular plate shape, and a second connecting portion 52 and a third connecting portion 53 which respectively project from the first connecting portion 51 in the substantially same directions which are substantially orthogonal to the first connection portion 51, for example. The second connecting portion 52 and the third connecting portion 53 extend continuously from the first connecting portion 51. However, the second connecting portion 52 and the third connecting portion 53 may be separable from the first connecting portion 51. The negative electrode current collector 60 is an integral body which is integrally formed by a first connecting portion 61 having a rectangular plate shape, and a second connecting portion 62 and a third connecting portion 63 which respectively project from the first connecting portion 61 in the substantially same directions which are substantially orthogonal to the first connecting portion 61, for example. The second connecting portion 62 and the third connecting portion 63 extend continuously from the first connecting portion 61. However, the second connecting portion 62 and the third connecting portion 63 may be separable from the first connecting portion 61. FIG. 7 is a view showing joint portions 71, 72 between the positive electrode current collecting tab groups 21d, 21e of the electrode assembly 20 and the positive electrode current collector 50 in FIG. 5 in an enlarged manner. FIG. 7 is also a view when the joint portions 71, 72 are viewed in a direction from the negative electrode terminal 40 toward the positive electrode terminal 30.

In this embodiment, the second connecting portion 52 and the third connecting portion 53 of the positive electrode current collector 50 respectively have a rectangular plate-like shape, and respectively extend continuously from two edges of the first connecting portion 51 positioned opposite to each other. The second connecting portion 52 is connected to the positive electrode current collecting tab group 21d, and the third connecting portion 53 is connected to the positive electrode current collecting tab group 21e. The second connecting portion 52 and the third connecting portion 53 have positions thereof in a longitudinal direction and in a lateral direction of the rectangular plate-like first connecting portion 51 displaced from each other such that the second connecting portion 52 and the third connecting portion 53 agree with the positive electrode current collecting tab groups 21d, 21e in position respectively. The second connecting portion 52 has a size and a shape which enable the second connecting portion 52 to overlap with the whole positive electrode current collecting tab group 21d in a stacking direction of the positive electrode current collecting tab group 21d. The third connecting portion 53 also has a size and a shape which enable the third connecting portion 53 to overlap with the whole positive electrode current collecting tab group 21e in a stacking direction of the positive electrode current collecting tab group 21e.

The first connecting portion 51 of the positive electrode current collector 50 is connected to a shaft portion 30b having a circular cylindrical shape which is formed on a plate-like terminal body 30a of the positive electrode terminal 30. The shaft portion 30b of the positive electrode terminal 30 extends in a penetrating manner through respective through holes formed in the upper insulating member 31, the lid body 12 and the lower insulating member 32 and a through hole 51a formed in the first connecting portion 51. In this embodiment, the shaft portion 30b of the positive electrode terminal 30 is connected to the first connecting portion 51 by swaging. That is, a diameter of a distal end of the shaft portion 30b which projects from the through hole 51a is plastically deformed by pressing. With such a configuration, the positive electrode terminal 30 and the positive electrode current collector 50 are fixed to the lid body 12 in a state where the upper insulating member 31, the lid body 12 and the lower insulating member 32 are clamped by the terminal body 30a and the first connecting portion 51. Accordingly, the positive electrode terminal 30 and the positive electrode current collector 50 are physically and electrically connected to each other.

The second connecting portion 62 of the negative electrode current collector 60 is connected to the negative electrode current collecting tab group 22d and the third connecting portion 63 of the negative electrode current collector 60 is connected to the negative electrode current collecting tab group 22e. In this embodiment, the second connecting portion 62 and the third connecting portion 63 respectively have a rectangular plate-like shape, and extend continuously from two edges of the first connecting portion 61 positioned opposite to each other. The second connecting portion 62 and the third connecting portion 63 have positions thereof in a longitudinal direction and in a lateral direction of the first connecting portion 61 displaced from each other such that the second connecting portion 62 and the third connecting portion 63 agree with the negative electrode current collecting tab groups 22d, 22e in position respectively. The second connecting portion 62 has a size and a shape which enable the second connecting portion 62 to overlap with the whole negative electrode current collecting tab group 22d in a stacking direction of the negative electrode current collecting tab group 22d. The third connecting portion 63 has a size and a shape which enable the third connecting portion 63 to overlap with the whole negative electrode current collecting tab group 22e in a stacking direction of the negative electrode current collecting tab group 22e.

The first connecting portion 61 of the negative electrode current collector 60 is connected to a shaft portion 40b having a circular cylindrical shape which is formed on a plate-like terminal body 40a of the negative electrode terminal 40. The shaft portion 40b of the negative electrode terminal 40 extends in a penetrating manner through respective through holes formed in the upper insulating member 41, the lid body 12, the lower insulating member 42 and a through hole 61a formed in the first connecting portion 61.

In this embodiment, the shaft portion 40b of the negative electrode terminal 40 is connected to the first connecting portion 61 by swaging a distal end of the shaft portion 40b which projects from the through hole 61a. With such a configuration, the negative electrode terminal 40 and the negative electrode current collector 60 are fixed to the lid body 12 in a state where the upper insulating member 41, the lid body 12 and the lower insulating member 42 are clamped by the terminal body 40a and the first connecting portion 61. With such a configuration, the negative electrode terminal 40 and the negative electrode current collector 60 are physically and electrically connected to each other. In this embodiment, the connection between the shaft portion 30b of the positive electrode terminal 30 and the first connecting portion 51, and the connection between the shaft portion 40b of the negative electrode terminal 40 and the first connecting portion 61 are not limited to the connection by swaging, and various connection methods such as welding, screwing are applicable.

The electrode assembly 20 which is connected to the positive electrode terminal 30 and the negative electrode terminal 40 via the positive electrode current collecting tab groups 21d, 21e and the negative electrode current collecting tab groups 22d, 22e is disposed on and is fixed to the lid body 12 with the winding axis A thereof directed in a direction substantially orthogonal to the lid body 12. The electrode assembly 20 disposed in such an arrangement is also referred to as a horizontally-winding-type electrode assembly. Further, in the electrode assembly 20, the positive electrode current collecting tab groups 21d, 21e and the negative electrode current collecting tab groups 22d, 22e are respectively positioned in a direction that the positive electrode current collecting tab groups 21d, 21e and the negative electrode current collecting tab groups 22d, 22e project toward the positive electrode terminal 30 and the negative electrode terminal 40 from the end portion 20a of the electrode assembly 20 respectively.

A connection by swaging, that is, swaging joining (plastic working) is applied to the joint portion 71 which is a connecting portion between the second connecting portion 52 of the positive electrode current collector 50 and the positive electrode current collecting tab group 21d and to the joint portion 72 which is a connecting portion between the third connecting portion 53 and the positive electrode current collecting tab group 21e. In the same manner, swaging joining is applied to the joint portion 73 between the second connecting portion 62 of the negative electrode current collector 60 and the negative electrode current collecting tab group 22d and to the joint portion 74 between the third connecting portion 63 and the negative electrode current collecting tab group 22e.

The positive electrode current collector 50 includes cover members 54, 55 which respectively form rectangular plate-like contact plates provided in addition to the connecting portions 51, 52 and 53. The cover members 54, 55 are made of a material having conductivity, and may be made of substantially the same material as the positive electrode current collector 50. The cover members 54, 55 have thicknesses smaller than thicknesses of the second connecting portion 52 and the third connecting portion 53 respectively. The second connecting portion 52 and the cover member 54 are disposed so as to sandwich the positive electrode current collecting tab group 21d therebetween. The second connecting portion 52, the positive electrode current collecting tab group 21d, and the cover member 54 are fixed to each other by being swaged together in a state where the second connecting portion 52, the positive electrode current collecting tab group 21d, and the cover member 54 are made to overlap with each other. The second connecting portion 52, the positive electrode current collecting tab group 21d, and the cover member 54 form the joint portion 71. In this embodiment, the positive electrode current collecting tab group 21d and the cover member 54 are disposed on an outer side surface of the second connecting portion 52. That is, the positive electrode current collecting tab group 21d and the cover member 54 are disposed on a surface of the second connecting portion 52 positioned on a side opposite to a direction from the second connecting portion 52 to the third connecting portion 53. In this embodiment, the cover members 54, 55 are examples of the second member.

Further, the third connecting portion 53 and the cover member 55 are disposed such that the third connecting portion 53 and the cover member 55 sandwich the positive electrode current collecting tab group 21e therebetween. The third connecting portion 53, the positive electrode current collecting tab group 21e, and the cover member 55 are fixed to each other by being swaged together in a state where the third connecting portion 53, the positive electrode current collecting tab group 21e, and the cover member 55 are made to overlap with each other. With such a configuration, the third connecting portion 53, the positive electrode current collecting tab group 21e, and the cover member 55 form the joint portion 72. In this embodiment, the positive electrode current collecting tab group 21e and the cover member 55 are disposed on an outer side surface of the third connecting portion 53. That is, the positive electrode current collecting tab group 21e and the cover member 55 are disposed on a surface of the third connecting portion 53 positioned on a side opposite to a direction from the third connecting portion 53 to the second connecting portion 52.

In the same manner, the negative electrode current collector 60 includes rectangular plate-like cover members 64, 65 provided in addition to the connecting portions 61, 62 and 63. The cover members 64, 65 are made of a material having conductivity, and may be made of substantially the same material as the negative electrode current collector 60. The cover members 64, 65 have thicknesses smaller than thicknesses of the second connecting portion 62 and the third connecting portion 63 respectively. The second connecting portion 62 and the cover member 64 are disposed so as to sandwich the negative electrode current collecting tab group 22d therebetween. The second connecting portion 62, the negative electrode current collecting tab group 22d, and the cover member 64 are fixed to each other by being swaged together in a state where the second connecting portion 62, the negative electrode current collecting tab group 22d, and the cover member 64 are made to overlap with each other. The second connecting portion 62, the negative electrode current collecting tab group 22d, and the cover member 64 form the joint portion 73. In this embodiment, the negative electrode current collecting tab group 22d and the cover member 64 are disposed on an outer side surface of the second connecting portion 62. That is, the negative electrode current collecting tab group 22d and the cover member 64 are disposed on a surface of the second connecting portion 62 positioned on a side opposite to a direction from the second connecting portion 62 to the third connecting portion 63. In this embodiment, the cover members 64, 65 are examples of the second member.

Further, the third connecting portion 63 and the cover member 65 are disposed such that the third connecting portion 63 and the cover member 65 sandwich the negative electrode current collecting tab group 22e therebetween. The third connecting portion 63, the negative electrode current collecting tab group 22e, and the cover member 65 are fixed to each other by being swaged together in a state where the third connecting portion 63, the negative electrode current collecting tab group 22e, and the cover member 65 are made to overlap with each other. The third connecting portion 63, the negative electrode current collecting tab group 22e, and the cover member 65 form the joint portion 74. In this embodiment, the negative electrode current collecting tab group 22e and the cover member 65 are disposed on an outer side surface of the third connecting portion 63. That is, the negative electrode current collecting tab group 22e and the cover member 65 are disposed on a surface of the third connecting portion 63 positioned on a side opposite to a direction from the third connecting portion 63 to the second connecting portion 62.

In both of the positive electrode current collector 50 and the negative electrode current collector 60, the arrangement configuration of the second connecting portion, the third connecting portion, the cover member and the current collecting tab group is not limited to the above-mentioned arrangement configuration. Any arrangement configuration may be adopted provided that the current collecting tab group is sandwiched by the second connecting portion, the third connecting portion and the cover member. For example, the cover member and the current collecting tab group may be disposed on the inner side of the second connecting portion and the third connecting portion in a sideward direction.

Figure 8:
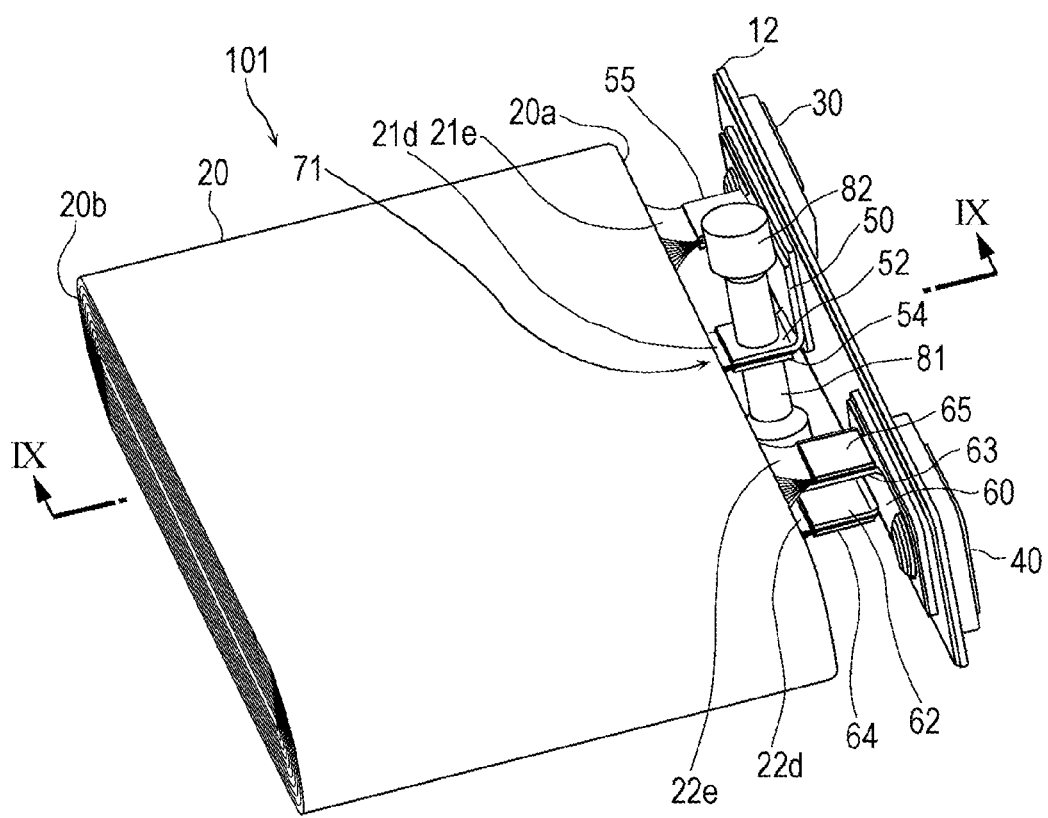
FIG. 8 is a perspective view showing a state at the time of connecting the positive electrode current collecting tab group of the electrode assembly and the positive electrode current collector in the assembly shown in FIG. 2.
Figure 9:
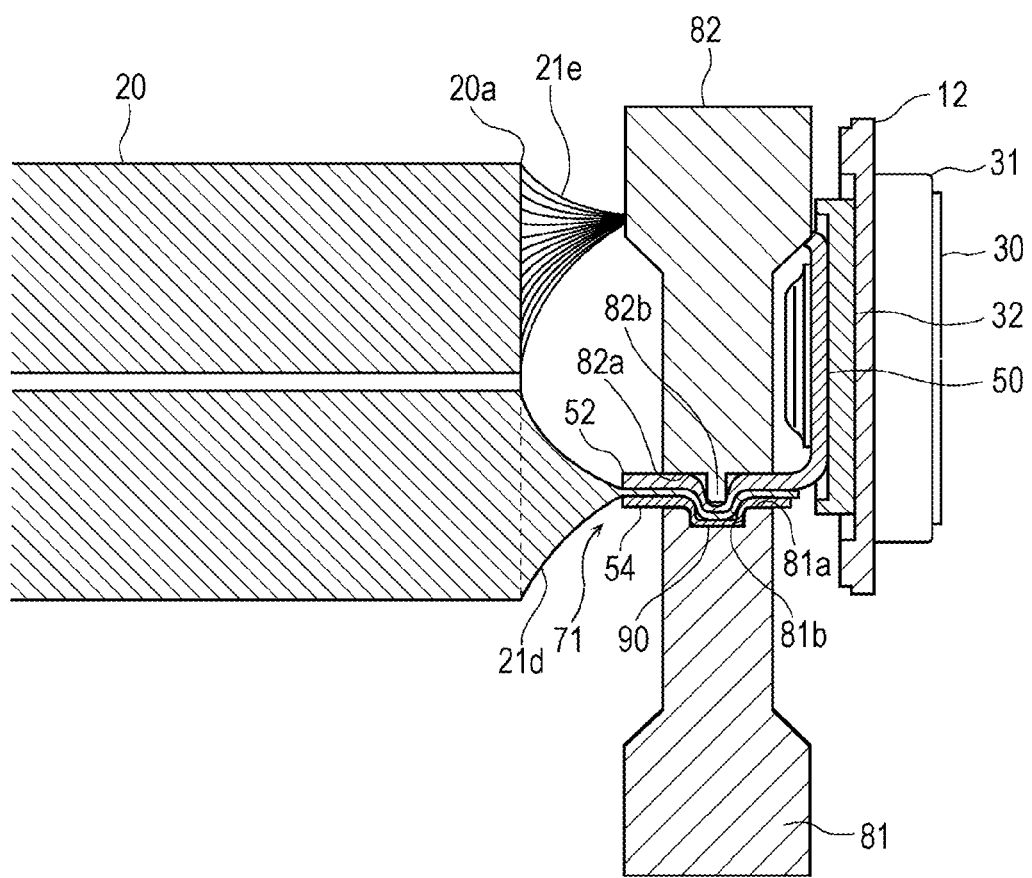
FIG. 9 is a cross-sectional side view taken along a cross section which passes the joint portion between the positive electrode current collecting tab group of the electrode assembly shown in FIG. 8 and the positive electrode current collector, and a die tool and a punching tool for connection as viewed in a direction IX.

Configurations of the joint portions 71, 72, 73 and 74 are described hereinafter. Since all of the joint portions 71, 72, 73 and 74 have substantially the same configuration, only the configuration of the joint portion 71 is described. With reference to FIG. 8 and FIG. 9, at the time of performing swaging joining, a die tool 81 and a punching tool 82 for connection by swaging are mounted on the second connecting portion 52, the positive electrode current collecting tab group 21d and the cover member 54 which are made to overlap with each other such that the positive electrode current collecting tab group 21d is sandwiched between the second connecting portion 52 of the positive electrode current collector 50 and the cover member 54. FIG. 8 is a perspective view showing a state of the assembly 101 in FIG. 2 when the positive electrode current collecting tab group 21d of the electrode assembly 20 and the positive electrode current collector 50 are connected to each other. FIG. 9 is a cross-sectional side view taken along a cross section which passes the joint portion 71 between the positive electrode current collecting tab group 21d of the electrode assembly 20 and the positive electrode current collector 50 shown in FIG. 8, and the die tool 81 and the punching tool 82 for connection as viewed in a direction IX.

The die tool 81 has a receiving surface 81a formed on an end portion thereof, and a recessed portion 81b which is recessed from the receiving surface 81a and has a circular cylindrical shape. The punching tool 82 has a pressing surface 82a formed on an end portion thereof, and a punch 82b which is a circular columnar projection projecting from the pressing surface 82a. At the time of performing swaging joining, the second connecting portion 52, the positive electrode current collecting tab group 21d, and the cover member 54 are made to overlap with each other in this order. The die tool 81 is disposed on the cover member 54 with the receiving surface 81a thereof directed toward the cover member 54, and the punching tool 82 is disposed on the second connecting portion 52 with the pressing surface 82a thereof directed toward the second connecting portion 52. At this stage of operation, the receiving surface 81a and the recessed portion 81b of the die tool 81 and the pressing surface 82a and the punch 82b of the punching tool 82 are positioned so as to face each other with the cover member 54, the positive electrode current collecting tab group 21d and the second connecting portion 52 interposed therebetween. Further, the die tool 81 is positioned below the punching tool 82.

When the punching tool 82 is pressed downward toward the die tool 81, the punch 82b presses the second connecting portion 52, the positive electrode current collecting tab group 21d and the cover member 54 together thus plastically deforming these members such that these members project into the recesses portion 81b of the die tool 81. Theses members may be further plastically deformed by pressing the cover member 54 in a direction that another punch having a circular columnar shape (not shown in the drawing) which is embedded in a bottom portion of the recessed portion 81b of the die tool 81 and is slidable in the axial direction projects from the bottom portion of the recessed portion 81b, that is, by pressing the cover member 54 upward.

Figure 10:
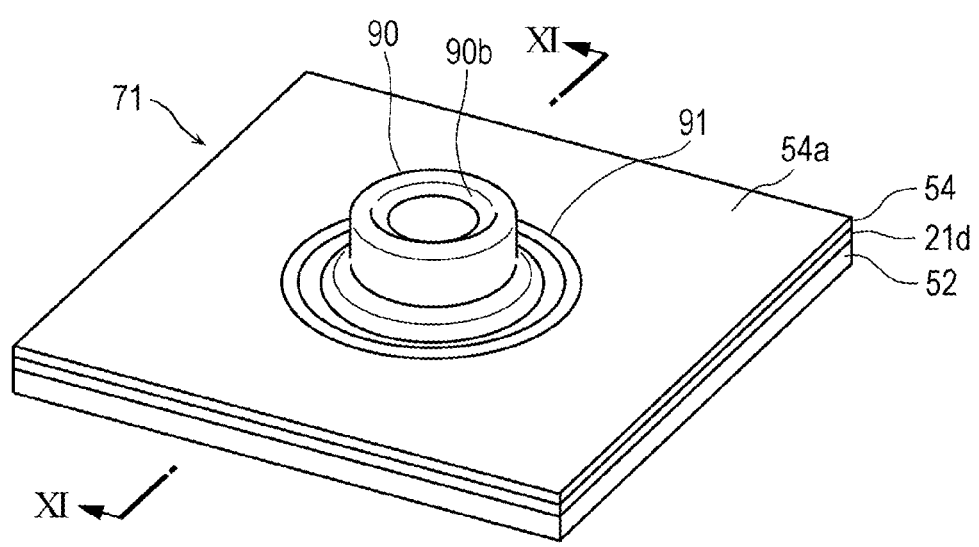
FIG. 10 is a perspective view of the joint portion after being caulked shown in FIG. 8 as viewed from a projecting side of a swaged joint portion of the joint portion.
Figure 11A:
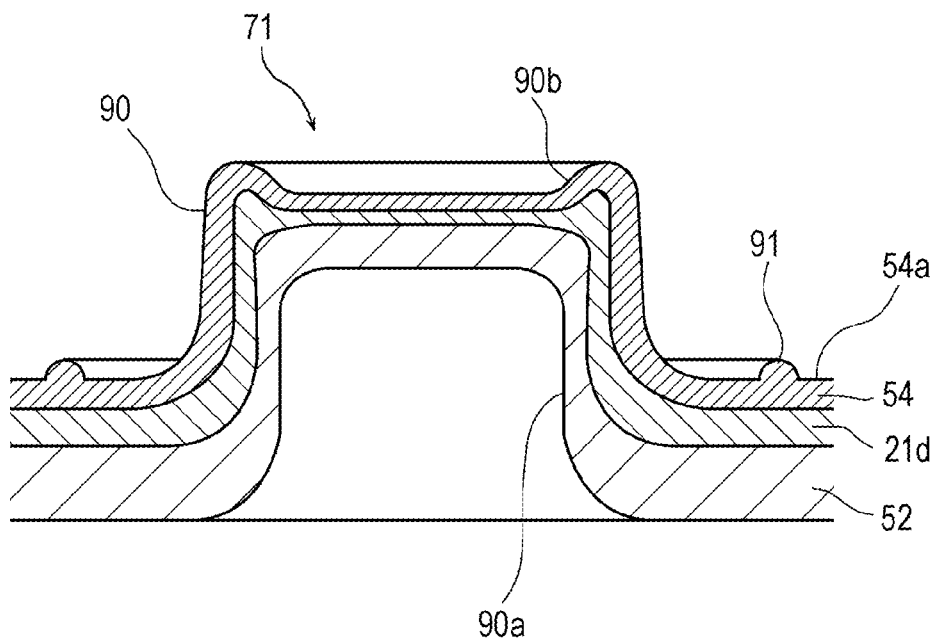
FIG. 11A is a cross-sectional view of the joint portion shown in FIG. 10 as viewed in a direction XI showing a cross section taken along a radial direction of the swaged joint portion of the joint portion.

As a result, the plastically deformed second connecting portion 52, positive electrode current collecting tab group 21d and the cover member 54 form a bottomed circular cylindrical swaged joint portion 90 which projects from a flat surface 54a of the cover member 54 as shown in FIG. 10 and FIG. 11A. A shape of the swaged joint portion 90 is not limited to the above-mentioned shape. FIG. 10 is a perspective view when the joint portion 71 after caulking joining in FIG. 8 is viewed from a projecting side of the swaged joint portion 90 of the joint portion 71. FIG. 11A is a cross-sectional view of the joint portion 71 shown in FIG. 10 as viewed in a direction XI in a cross section taken along a radial direction of the swaged joint portion 90 of the joint portion 71. The swaged joint portion 90 shown in FIG. 10 and FIG. 11A is formed by receiving pressing of the punch embedded in the bottom portion of the recessed portion 81b of the die tool 81.

In the swaged joint portion 90, the second connecting portion 52 of the positive electrode current collector 50, the positive electrode current collecting tab group 21d, and the cover member 54 are brought into close contact with each other and are integrally deformed thus forming a bottomed circular cylindrical shape in a state where the cover member 54 is positioned at an outermost side. In the swaged joint portion 90, a circular cylindrical inner recessed portion 90a is formed on an inner side of the second connecting portion 52 which is positioned on an innermost side. Such a swaged joint portion 90 has a stereoscopic structure where the second connecting portion 52 and the positive electrode current collecting tab group 21d are plastically deformed so as to enter the inner side of the cover member 54 which is plastically deformed in a projecting manner and to follow an inner shape of the cover member 54. In this stereoscopic structure, the second connecting portion 52, the positive electrode current collecting tab group 21d, and the cover member 54 are deformed so as to follow the shape of the punch 82b of the punching tool 82 and shapes of the respective members. Further, on a cover member 54 side, both the second connecting portion 52 and the cover member 54 project in a direction extending from the second connecting portion 52 toward the cover member 54, and on a second connecting portion 52 side, both the second connecting portion 52 and the cover member 54 are recessed in a direction extending from the second connecting portion 52 toward the cover member 54. In this manner, in the swaged joint portion 90, the second connecting portion 52 and the cover member 54 form a concavo-convex structure which projects from the second connecting portion 52 toward the cover member 54. With such a concavo-convex structure, the second connecting portion 52 and the cover member 54 are engaged with each other by fitting engagement and hence, the second connecting portion 52 and the cover member 54 are joined to each other.

In the swaged joint portion 90 described above, a joint between the second connecting portion 52, the positive electrode current collecting tab group 21d, and the cover member 54 is formed. Further, by pressing the cover member 54 using another punch from the bottom portion of the recessed portion 81b of the die tool 81, an outer recessed portion 90b having a flat frustoconical shape is formed on a bottom portion which is a projection end of the swaged joint portion 90. In and around the outer recessed portion 90b, deformed shapes of the positive electrode current collecting tab group 21d and the cover member 54 become complicated and hence, a joining strength between the second connecting portion 52, the positive electrode current collecting tab group 21d, and the cover member 54 is enhanced.

A thickness of the cover member 54 is smaller than a thickness of the second connecting portion 52. Accordingly, the cover member 54 which is more deformable than the second connecting portion 52 is deformed more easily than the second connecting portion 52 which is less deformable than the cover member 54. Accordingly, the second connecting portion 52, the positive electrode current collecting tab group 21d, and the cover member 54 can form a bottomed cylindrical shape of the swaged joint portion 90 in a state where the second connecting portion 52, the positive electrode current collecting tab group 21d, and the cover member 54 are brought into close contact with each other and are formed into an integral body. With such a configuration, a joining strength at the swaged joint portion 90 is enhanced.

A swaging method for forming the swaged joint portion 90 as described above may be referred to as clinching swaging. In clinching swaging, the first member such as the second connecting portion 52 of the positive electrode current collector 50 and the second member such as the cover member 54 form the joint portion where the first member and the second member are engaged with each other by fitting engagement due to the concavo-convex structure which projects from the first member toward the second member. A method of performing clinching swaging applied to the swaged joint portion 90 is not limited to the above-mentioned method and, various methods are conceivable. Further, the swaged joint portion 90 may be formed such that the swaged joint portion 90 does not project in a direction from the second connecting portion 52 toward the cover member 54 as described above but projects in a direction from the cover member 54 toward the second connecting portion 52.

Further, on the outer surface 54a of the cover member 54, a rigidity changing part 91 is formed around the swaged joint portion 90. The outer surface 54a of the cover member 54 is a surface positioned on a projecting direction side of the swaged joint portion 90 out of two wide flat surfaces of the cover member 54 opposite to each other. The rigidity changing part 91 is an element which changes rigidity of the cover member 54 in or in the vicinity of the rigidity changing part 91. The rigidity changing part 91 forms the joint portion 71 together with the swaged joint portion 90.

In this embodiment, the rigidity changing part 91 is a strip-shaped projection projecting from the outer surface 54a of the cover member 54. The rigidity changing part (hereinafter also referred to as a strip-shaped projection) 91 is an annular continuous strip-shaped projection which surrounds the swaged joint portion 90 on the flat outer surface 54*a* of the cover member 54. The strip-shaped projection 91 is integrally formed with the cover member 54. That is, the strip-shaped projection 91 is made of the same material as the cover member 54, and extends continuously from the cover member 54. The strip-shaped projection 91 is disposed at a position away from the swaged joint portion 90. To be more specific, the strip-shaped projection 91 is disposed away from a base portion of the swaged joint portion 90 on the outer surface 54*a* radially outward. Alternatively, the strip-shaped projection 91 may be disposed at the base portion of the swaged joint portion 90. That is, the strip-shaped projection 91 is disposed on the side of the swaged joint portion 90 on the outer surface 54*a* of the cover member 54.

The strip-shaped projection 91 may be formed simultaneously at the time of manufacturing the cover member 54, may be formed by applying working such as press working after manufacturing the cover member 54, or may be formed at the time of swaging by using the die tool 81 and the punching tool 82. When the strip-shaped projection 91 is formed at the time of swaging, unevenness for forming the strip-shaped projection 91 by deforming the cover member 54 may be formed on the receiving surface 81*a* of the die tool 81 which is brought into contact with the cover member 54. Alternatively, the strip-shaped projection 91 may be formed after swaging by using the die tool 81 and the punching tool 82.

In the cover member 54, a portion where the strip-shaped projection 91 is formed has a larger cross section than a portion disposed adjacently to the strip-shaped projection 91 on an outer side and hence, the portion where the strip-shaped projection 91 is formed has a higher rigidity than the portion disposed adjacently to the strip-shaped projection 91 on an outer side. The portion on an outer side of the strip-shaped projection 91 means a portion on a side opposite to a portion disposed on the inner side of the strip-shaped projection 91 where the swaged joint portion 90 is formed with the strip-shaped projection 91 interposed between the portions in a direction along the outer surface 54*a* of the cover member 54. Accordingly, when a bending load which intends to peel off the cover member 54 from the second connecting portion 52 is applied to the cover member 54 on an outer side of the strip-shaped projection 91, the cover member 54 is bent at a position in the vicinity of an outer side of the strip-shaped projection 91 at first thus suppressing deformation of the cover member 54 on the inner side of the strip-shaped projection 91. Particularly, the strip-shaped projection 91 extends continuously so as to surround the swaged joint portion 90 over the whole circumference and hence, even when a bending load described above is applied to the cover member 54 from any direction, the deformation of the cover member 54 at the inner side of the strip-shaped projection 91 can be suppressed.

Figure 11B:
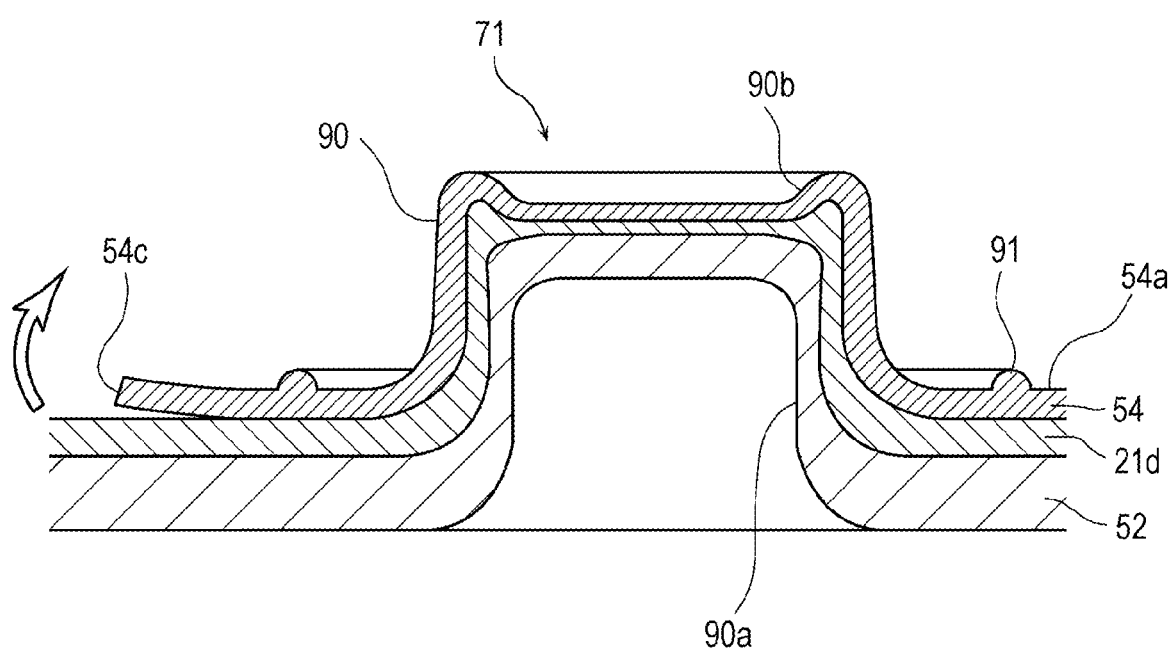
FIG. 11B is a cross-sectional view showing a state of the swaged joint portion when the cover member in FIG. 11A receives a load in a direction that joining by caulking is released.

For example, assume the case shown in FIG. 11B where a load in a direction indicated by a blanked arrow in the drawing which intends to peel off the cover member 54 from the second connecting portion 52 acts on an end portion 54*c* of the cover member 54. In this case, due to rigidity of the strip-shaped projection 91 which locally enhanced, the deformation of the cover member 54 is suppressed to the outside of the strip-shaped projection 91. With such enhanced rigidity of the strip-shaped projection 91, it is possible to suppress the propagation of a stress to the swaged joint portion 90 at the inner side of the strip-shaped projection 91. FIG. 11B is a cross-sectional view showing a state of the swaged joint portion 90 when the cover member 54 in FIG. 11A receives a load in a direction that joining by swaging is released.

On the other hand, when a bending load described above is applied to the cover member 54 in a state where the strip-shaped projection 91 is not formed, a possibility that the cover member 54 is deformed so as to increase a diameter of the base portion of the swaged joint portion 90 radially outward becomes high. When the cover member 54 is deformed in this manner, joining at the swaged joint portion 90 is loosened or the swaged joint portion 90 is broken. Accordingly, the strip-shaped projection 91 enhances durability of the swaged joint portion 90. Also in the joint portions 72, 73 and 74, the swaged joint portion 90 and the strip-shaped projection 91 are formed in the same manner as the joint portion 71.

Figure 12:
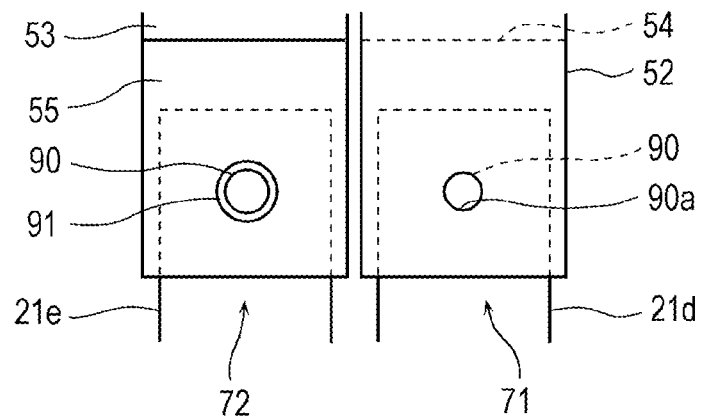
FIG. 12 is a side view showing the joint portion between the positive electrode current collecting tab group of the electrode assembly and the positive electrode current collector shown in FIG. 5 in an enlarged manner.

In FIG. 7, FIG. 8, FIG. 9 and FIG. 12, the joint portions 71, 72 between the positive electrode current collector 50 and the positive electrode current collecting tab groups 21*d*, 21*e* of the electrode assembly 20 are shown. FIG. 12 is a side view showing the joint portions 71, 72 between the positive electrode current collecting tab groups 21*d*, 21*e* of the electrode assembly 20 and the positive electrode current collector 50 shown in FIG. 5 in an enlarged manner. The swaged joint portion 90 of the joint portion 71 and the swaged joint portion 90 of the joint portion 72 project in directions opposite to each other with respect to the positive electrode current collector 50. With such a configuration, as shown particularly in FIG. 8 and FIG. 9, at the time of connecting the positive electrode current collector 50 and the positive electrode current collecting tab groups 21*d*, 21*e* of the electrode assembly 20 to each other, in a state where one joint portion to be joined is disposed below the other joint portion out of the joint portions 71 and 72, the joint portion to be joined is set to the die tool 81. Accordingly, setting and fixing of the joint portion to be joined to the die tool 81 can be easily performed from the beginning of the swaging to the completion of the swaging.

Further, the joint portions 71, 72 are disposed at different positions in a direction from the third connecting portion 53 toward the second connecting portion 52 of the positive electrode current collector 50 which is a pressing direction of the punching tool 82 to the die tool 81, that is, in a stacking direction of the positive electrode current collecting tab groups 21*d*, 21*e*. Accordingly, swaging by using the die tool 81 and the punching tool 82 can be individually performed at the respective joint portions 71, 72. Further, unlike the case where the positive electrode current collecting tabs 21*c* included in the positive electrode current collecting tab groups 21*d*, 21*e* are connected to the positive electrode current collector 50 at one joint portion, the positive electrode current collecting tabs 21*c* are connected to the positive electrode current collector 50 at two joint portions 71, 72 and hence, the number of positive electrode current collecting tabs 21*c* which are connected to the positive electrode current collector 50 by swaging in each of the joint portions 71, 72 is reduced. With such a configuration, it is possible to increase a joining strength at the swaged joint portion 90 without increasing the swaged joint portion 90 in size. Although the description has been made with respect to the joint portions 71, 72 between the positive electrode current collector 50 and the positive electrode current collecting tab groups 21*d*, 21*e* heretofore, the joint portions 73, 74 between the negative electrode current collector 60 and the negative electrode current collecting tab groups 22*d*, 22*e* also have substantially the same configuration and can acquire substantially the same manner of operation and advantageous effects as the above-mentioned configuration, manner of operation and advantageous effects.

As described above, the energy storage device 100 according to this embodiment includes the positive electrode current collector 50 and the negative electrode current collector 60 which respectively have conductivity and are joined to each other, and the cover members 54, 55, 64 and 65. The energy storage device 100 includes the swaged joint portions 90 which join the positive electrode current collector 50 and the cover members 54, 55 to each other respectively and, at the same time, project in the direction from the positive electrode current collector 50 toward the cover members 54, 55 respectively, and the joint portions 90 which join the negative electrode current collector 60 and the cover members 64, 65 to each other respectively and, at the same time, project in the direction from the negative electrode current collector 60 toward the cover members 64, 65. The cover members 54, 55, 64 and 65 respectively include the strip-shaped projection 91 which forms the rigidity changing part on the side of the swaged joint portion 90.

In the above-mentioned configuration, rigidities of the cover members 54, 55, 64 and 65 which includes the swaged joint portion 90 respectively change at the strip-shaped projection 91 disposed on the side of the swaged joint portion 90. Accordingly, when the cover member 54, 55, 64 or 65 receives a bending load at a portion outside the strip-shaped projection 91 on a side opposite to the swaged joint portion 90, the cover member 54, 55, 64 and 65 can be deformed at or in the vicinity of the strip-shaped projection 91 or at a portion in the vicinity of the strip-shaped projection 91 at first. Accordingly, the disengagement of the swaged joint portion brought about by the deformation of the swaged joint portion 90 can be suppressed.

In the energy storage device 100 according to the embodiment, the strip-shaped projection 91 projects from each surface of the cover member 54, 55, 64, and 65 on the side of the swaged joint portion 90. For example, the strip-shaped projection 91 projects from the outer surface 54a of the cover member 54. In the above-mentioned configuration, rigidity of the cover member 54, 55, 64 and 65 is enhanced at a portion where the strip-shaped projection 91 is formed. Accordingly, when the cover member 54, 55, 64 or 65 receives a bending load at a portion outside the strip-shaped projection 91, the cover member 54, 55, 64 or 65 may deform at a portion in the vicinity of an outer side of the strip-shaped projection 91 at first.

In the energy storage device 100 according to the embodiment, in the swaged joint portion 90, both the positive electrode current collector 50 and the cover member 54 or 55 project in a direction from the positive electrode current collector 50 toward the cover member 54 or 55 on a side of the cover member 54 or 55 and, at the same time, are recessed in a direction from the positive electrode current collector 50 toward the cover member 54 or 55 on a side of the positive electrode current collector 50. In the above-mentioned configuration, the positive electrode current collector 50 and the cover member 54 or 55 are integrally deformed thus forming the swaged joint portion 90. Such a swaged joint portion 90 can join the positive electrode current collector 50 and the cover member 54 or 55 to each other with certainty. Also the negative electrode current collector 60 and the cover members 64 and 65 have substantially the same configuration, and can acquire substantially the same advantageous effects as the above-mentioned configuration and advantageous effects.

In the energy storage device 100 according to the embodiment, the positive electrode plate 21 is sandwiched between the positive electrode current collector 50 and the cover members 54, 55. To be more specific, the positive electrode current collecting tab groups 21d, 21e of the positive electrode plate 21 are sandwiched. In the above-mentioned configuration, in the swaged joint portion 90, the plurality of positive electrode current collecting tabs 21c of the positive electrode current collecting tab groups 21d, 21e are deformed integrally with the positive electrode current collector 50 and the cover members 54, 55. Accordingly, the positive electrode current collecting tab groups 21d, 21e are firmly connected with the positive electrode current collector 50 due to joining by caulking. Also the negative electrode current collector 60, the negative electrode current collecting tab group 22d, 22e, and the cover members 64 and 65 have substantially the same configuration, and can acquire substantially the same advantageous effects as the above-mentioned configuration and advantageous effects.

In the energy storage device 100 according to the embodiment, the cover members 54, 55 on a side where the swaged joint portion 90 projects respectively have a thickness smaller than a thickness of the positive electrode current collector 50. To be more specific, the cover members 54, 55 respectively have a thickness smaller than a thickness of the second connecting portion 52 and a thickness of the third connecting portion 53 of the positive electrode current collector 50. In the above-mentioned configuration, in the swaged joint portion 90, the cover members 54, 55 are deformed more largely than the second connecting portion 52 and the third connecting portion 53 of the positive electrode current collector 50 so that the cover members 54, 55 are deformed more easily than the second connecting portion 52 and the third connecting portion 53 of the positive electrode current collector 50. Accordingly, the cover member 54 or 55 and the second connecting portion 52 or the third connecting portion 53 are integrally deformable so as to follow the shape of the punch 82b of the punching tool 82 used in joining by swaging and the shapes of these members. Accordingly, strong and reliable swaged joint portion 90 can be formed. The negative electrode current collector 60 and the cover members 64 and 65 also have substantially the same configuration, and can acquire substantially the same advantageous effects as the above-mentioned configuration and advantageous effects.

Further, the energy storage device 100 according to this embodiment includes: the positive electrode terminal 30 and the negative electrode terminal 40; the electrode assembly 20 formed by stacking the positive electrode plate 21 and the negative electrode plate 22 to each other; and the positive electrode current collector 50 and the negative electrode current collector 60 which connect the positive electrode terminal 30 and the negative electrode terminal 40 to the electrode assembly 20 respectively. In the energy storage device 100, the positive electrode plate 21 includes the positive electrode current collecting tab groups 21d, 21e which are respectively formed by stacking at least one or more positive electrode current collecting tabs 21c projecting toward the positive electrode terminal 30, and the positive electrode current collecting tab groups 21d, 21e are respectively connected to the positive electrode current collector 50. The negative electrode plate 22 includes the negative electrode current collecting tab groups 22d, 22e which are respectively formed by stacking at least one or more negative electrode current collecting tabs 22c projecting toward the negative electrode terminal 40, and the negative electrode current collecting tab groups 22d, 22e are respectively connected to the negative electrode current collector 60. Further, a set of the positive electrode current collecting tab group 21*d* and the positive electrode current collector 50, and a set of the positive electrode current collecting tab group 21*e* and the positive electrode current collector 50 respectively have the swaged joint portion 90 which projects from either one of the positive electrode current collecting tab group 21*d*, 21*e* or the positive electrode current collector 50 to the other of the positive electrode current collecting tab group 21*d*, 21*e* or the positive electrode current collector 50. In the same manner, a set of the negative electrode current collecting tab group 22*d* and the negative electrode current collector 60 and a set of the negative electrode current collecting tab group 22*e* and the negative electrode current collector 60 respectively have the swaged joint portion 90 which projects from either one of the negative electrode current collecting tab group 22*d*, 22*e* or the negative electrode current collector 60 to the other of the negative electrode current collecting tab group 22*d*, 22*e* or the negative electrode current collector 60.

In the above-mentioned configuration, the positive electrode current collecting tabs 21*c* are stacked to each other in a divided manner into a plurality of, for example, two positive electrode current collecting tab groups 21*d*, 21*e*, and the negative electrode current collecting tabs 22*c* are stacked to each other in a divided manner into a plurality of, for example, two negative electrode current collecting tab groups 22*d*, 22*e*. With such a configuration, a thickness in a stacking direction of the current collecting tabs per one current collecting tab group is reduced and hence, joining by swaging between the positive electrode current collecting tab group 21*d* and the positive electrode current collector 50, joining by swaging between the positive electrode current collecting tab group 21*e* and the positive electrode current collector 50, joining by swaging between the negative electrode current collecting tab group 22*d* and the negative electrode current collector 60, and joining by swaging between the negative electrode current collecting tab group 22*e* and the negative electrode current collector 60 can be facilitated. Further, a diameter of the punch 82*b* of the punching tool 82 used for joining by swaging can be made small and hence, a projecting diameter of the swaged joint portion 90 can be made small and, at the same time, projecting lengths of the positive electrode current collecting tab groups 21*d*, 21*e* and projecting lengths of the negative electrode current collecting tab groups 22*d*, 22*e* from the end portion 20*a* of the electrode assembly 20 can be made small.

Still further, the joining is performed by swaging and hence, at the time of joining, the generation of metal particles and metal powders from the positive electrode base material of the positive electrode current collecting tab groups 21*d*, 21*e* and from the negative electrode base material of the negative electrode current collecting tab groups 22*d*, 22*e* can be suppressed to a low level. Accordingly, the occurrence of short-circuiting between the positive electrode plate 21 and the negative electrode plate 22 attributed to generated metal particles and metal powders can be suppressed. For example, there is a possibility that, when metal particles and metal powders generated from the negative electrode base material reach the positive electrode plate 21, the metal particles and metal powders are ionized and flow in the positive electrode plate 21 and, further, reach the negative electrode plate 22 through the separator 23 and are deposited on the negative electrode plate 22. When the deposit on the negative electrode plate 22 grows and is accumulated, there is a possibility that the accumulated deposit causes internal short-circuiting between the positive electrode plate 21 and the negative electrode plate 22. The horizontally-winding-type electrode assembly 20 is configured such that when the energy storage device 100 is disposed with the lid body 12 facing upward, the positive electrode current collecting tab groups 21*d*, 21*e* and the negative electrode current collecting tab groups 22*d*, 22*e* are positioned on an upper portion of the electrode assembly 20. The suppression of the generation of metal particles and metal powders is effective for the suppression of intrusion of metal particles and metal powders into the electrode assembly 20 from the respective current collecting tab groups.

In the energy storage device 100 according to the embodiment, the positive electrode current collecting tab groups 21*d*, 21*e* are disposed at positions which differ from each other in the stacking direction of the positive electrode current collecting tabs 21*c*. That is, when the positive electrode current collecting tab groups 21*d*, 21*e* are viewed in the stacking direction of the positive electrode current collecting tabs 21*c*, the positive electrode current collecting tab groups 21*d*, 21*e* are disposed at different positions. In the same manner, the negative electrode current collecting tab groups 22*d*, 22*e* are disposed at positions which differ from each other in the stacking direction of the negative electrode current collecting tabs 22*c*. That is, when the negative electrode current collecting tab groups 22*d*, 22*e* are viewed in the stacking direction of the negative electrode current collecting tabs 22*c*, the negative electrode current collecting tab groups 22*d*, 22*e* are disposed at different positions.

In the above-mentioned configuration, the plurality of positive electrode current collecting tabs 21*c* are divided into a plurality of bundles at positions different from each other in the stacking direction thus forming the positive electrode current collecting tab groups 21*d*, 21*e*. The plurality of negative electrode current collecting tabs 22*c* are divided into a plurality of bundles at positions different from each other in the stacking direction thus forming the negative electrode current collecting tab groups 22*d*, 22*e*. Accordingly, at the time of joining the positive electrode current collecting tab groups 21*d*, 21*e* by swaging respectively, the die tool 81 and the punching tool 82 can perform joining of the respective positive electrode current collecting tab groups 21*d*, 21*e* while displacing positions of the respective positive electrode current collecting tab groups 21*d*, 21*e* in the winding direction of the electrode assembly 20. In the same manner, at the time of joining the negative electrode current collecting tab groups 22*d*, 22*e* by swaging respectively, the die tool 81 and the punching tool 82 can perform joining of the respective negative electrode current collecting tab groups 22*d*, 22*e* while displacing positions of the respective negative electrode current collecting tab groups 22*d*, 22*e* in the winding direction of the electrode assembly 20. Accordingly, projection lengths of the plurality of positive electrode current collecting tabs 21*c* can be made equal to each other, and projection lengths of the plurality of negative electrode current collecting tabs 22*c* can be made equal to each other. Therefore, the positive electrode current collecting tab groups 21*d*, 21*e* where projection lengths of the positive electrode current collecting tabs 21*c* are suppressed can be formed, and the negative electrode current collecting tab groups 22*d*, 22*e* where projection lengths of the negative electrode current collecting tabs 22*c* are suppressed can be formed.

In the energy storage device 100 according to the embodiment, the positive electrode current collector 50 includes the plurality of connecting portions 52, 53 connected to the positive electrode current collecting tab groups 21*d*, 21*e* respectively, and the negative electrode current collector 60 includes the plurality of connecting portions 62, 63 connected to the negative electrode current collecting tab groups 22*d*, 22*e* respectively. Further, among the positive electrode current collecting tab groups 21*d*, 21*e* and the connecting portions 52, 53, the positive electrode current collecting tab group and the connecting portion which correspond to each other have the swaged joint portion 90 which projects from either one of the positive electrode current collecting tab group or the connecting portion to the other of the positive electrode current collecting tab group or the connecting portion. In the same manner, among the negative electrode current collecting tab groups 22*d*, 22*e* and the connecting portions 62, 63, the negative electrode current collecting tab group and the connecting portion which correspond to each other have the swaged joint portion 90 which projects from one of the negative electrode current collecting tab group or the connecting portion to the other of the negative electrode current collecting tab group or the connecting portion. In the above-mentioned configuration, the current collecting tab groups 21*d*, 21*e*, 22*d* and 22*e* are respectively joined to the corresponding connecting portions 52, 53, 62 and 63 by swaging and hence, joining by swaging can be easily performed.

In the energy storage device 100 according to the embodiment, two swaged joint portions 90 which the positive electrode current collector 50 and two positive electrode current collecting tab groups 21*d*, 21*e* have in common project in directions opposite to each other. In the same manner, two swaged joint portions 90 which the negative electrode current collector 60 and two negative electrode current collecting tab groups 22*d*, 22*e* have in common project in directions opposite to each other. In the above-mentioned configuration, at the time of connecting two positive electrode current collecting tab groups 21*d*, 21*e* to the connecting portions 52, 53 of the positive electrode current collector 50 so as to sandwich the positive electrode current collector 50 therebetween, in the respective joint portions 71, 72, two swaged joint portions 90 are formed by swaging from different sides. Accordingly, joining of two positive electrode current collecting tab groups 21*d*, 21*e* and the positive electrode current collector 50 can be easily performed. Also two negative electrode current collecting tab groups 22*d*, 22*e* and the negative electrode current collector 60 can acquire substantially the same advantageous effects as the above-mentioned advantageous effects.

In the energy storage device 100 according to the embodiment, the strip-shaped projection 91 which forms the rigidity changing part is formed on the outer surfaces of the cover members 54, 55, 64 and 65. However, the present invention is not limited to such a configuration. The strip-shaped projection 91 may be formed on inner surfaces of the cover members 54, 55, 64 and 65 on a side opposite to the outer surfaces of the cover members 54, 55, 64 and 65, or the strip-shaped projection 91 may be formed on the outer surfaces and the inner surfaces of the cover members 54, 55, 64 and 65 respectively. Further, the strip-shaped projection 91 may be formed on the second connecting portion 52 and the third connecting portion 53 of the positive electrode current collector 50 and on the second connecting portion 62 and the third connecting portion 63 of the negative electrode current collector 60 without being formed on the cover members 54, 55, 64 and 65, or in addition to the cover members 54, 55, 64 and 65. In this case, the strip-shaped projection 91 may be formed on one surface of the second connecting portion and one surface of the third connecting portion. Alternatively, the strip-shaped projection 91 may be formed on two surfaces of the second connecting portion and two surfaces of the third connecting portion at positions opposite to each other. Further, when the strip-shaped projection 91 is formed on the cover members, the second connecting portion and the third connecting portion, the positions of the strip-shaped projections 91 may be aligned with each other or may differ from each other in the stacking direction of the cover member and the second connecting portion and in the stacking direction of the cover member and the third connecting portion. The same goes for strip-shaped projections 91*a*, 91*b* described later.

In the energy storage device 100 according to the embodiment, the strip-shaped projection 91 which is formed as the rigidity changing part on the outer surfaces of the cover members 54, 55, 64 and 65 respectively has a continuous annular planar shape. However, the strip-shaped projection 91 is not limited to such a configuration, and the strip-shaped projection 91 may have any shape. The planar shape is a shape of the strip-shaped projection 91 when the swaged joint portion 90 is viewed from a direction perpendicular to the outer surface 54*a* of the cover member 54, for example. The rigidity changing part formed of a projection may be formed of a plurality of projections which are arranged in a divided annular shape. In this case, each of the plurality of projections may be formed of a strip-shaped projection and/or a dot-like projection. The planar shape of the rigidity changing part formed of a projection may be any shape such as a linear line segment, a curved line segment, an elliptical shape, an elongated circular shape, a polygonal shape, or a combination of these shapes.

In the energy storage device 100 according to the embodiment, it is sufficient for the rigidity changing part formed of a projection that the rigidity changing part be merely disposed between a portion of the cover member 54, 55, 64 or 65 to which a bending load is expected to be applied and the swaged joint portion 90. With such a configuration, the rigidity changing part can suppress the transmission of a bending load to the cover member 54, 55, 64 or 65 of the swaged joint portion 90.

Figure 13:
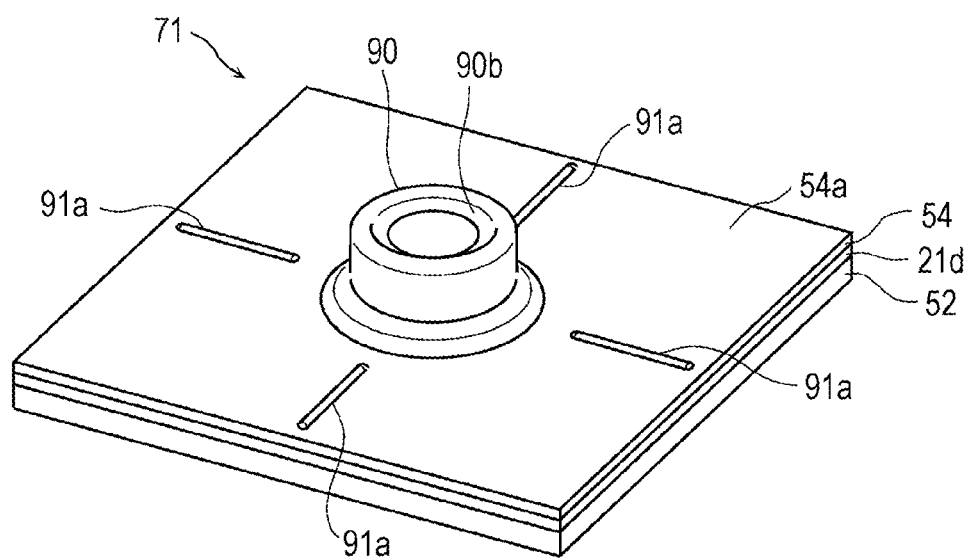
FIG. 13 is a perspective view showing another example of a strip-shaped projection of the joint portion shown in FIG. 10.

For example, as show in FIG. 13 which shows another example of the strip-shaped projection 91 of the joint portion 71 shown in FIG. 10, the rigidity changing part formed of a projection may be formed of a plurality of linear strip-shaped projections 91*a* extending in a radial direction toward radially outer sides from the circular cylindrical swaged joint portion 90. In FIG. 13, four strip-shaped projections 91*a* are formed. The strip-shaped projection 91*a* enhances bending rigidity of a portion of the cover member 54 where the strip-shaped projection 91*a* is formed in a longitudinal direction of the strip-shaped projection 91*a*.

Figure 14:
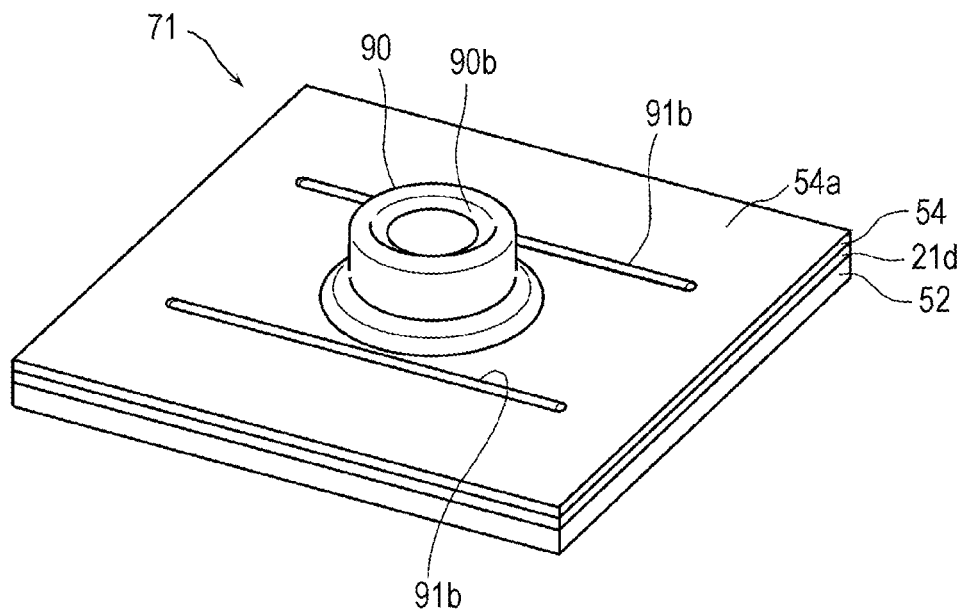
FIG. 14 is a perspective view showing still another example of the strip-shaped projection of the joint portion shown in FIG. 10.

Alternatively, as shown in FIG. 14 which shows still another example of the strip-shaped projection 91 of the joint portion 71 shown in FIG. 10, the rigidity changing parts respectively formed of a projection may be linear strip-shaped projections 91*b* which are disposed adjacently to the swaged joint portion 90 and extend so as not to intersect with the swaged joint portion 90. In FIG. 14, two strip-shaped projections 91*b* are formed on both sides of the swaged joint portion 90 in such a manner that the strip-shaped projections 91*b* are disposed substantially parallel to each other along the swaged joint portion 90. Further, each strip-shaped projection 91*b* has a length larger than a diameter of a base portion of the swaged joint portion 90. When the swaged joint portion 90 is projected in a direction perpendicular to the longitudinal direction of the strip-shaped projection 91*b*, both ends of each strip-shaped projection 91*b* project from a projection image of the swaged joint portion 90. When a cover member 54 having such a configuration receives a bending load at a portion on a side opposite to the swaged joint portion 90 with respect to the strip-shaped projection 91b, that is, a portion outside the strip-shaped projection 91b, for example, the cover member 54 is bent at a portion in the vicinity of the strip-shaped projection 91b on an outer side of the strip-shaped projection 91b at first. With such a configuration, the occurrence of deformation of the cover member 54 at the swaged joint portion 90 can be suppressed. With the use of the strip-shaped projection 91b having a linear shape, the cover member 54 is easily bendable compared to the strip-shaped projection 91 having an annular shape. Further, with the use of the strip-shaped projections 91b which extend in a largely projecting manner from both sides of the swaged joint portion 90, an influence which the deformation of the cover member 54 exerts on the swaged joint portion 90 can be suppressed to a low level.

[Modification 1]

Figure 15:
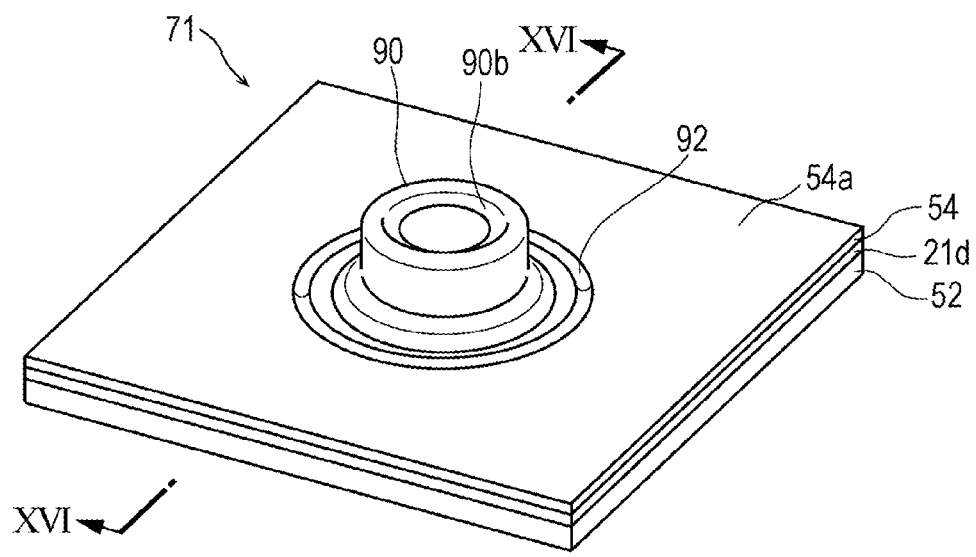
FIG. 15 is a view showing a modification 1 of the energy storage device according to the embodiment, and is a perspective view showing a modification of the joint portion shown in FIG. 10.
Figure 16A:
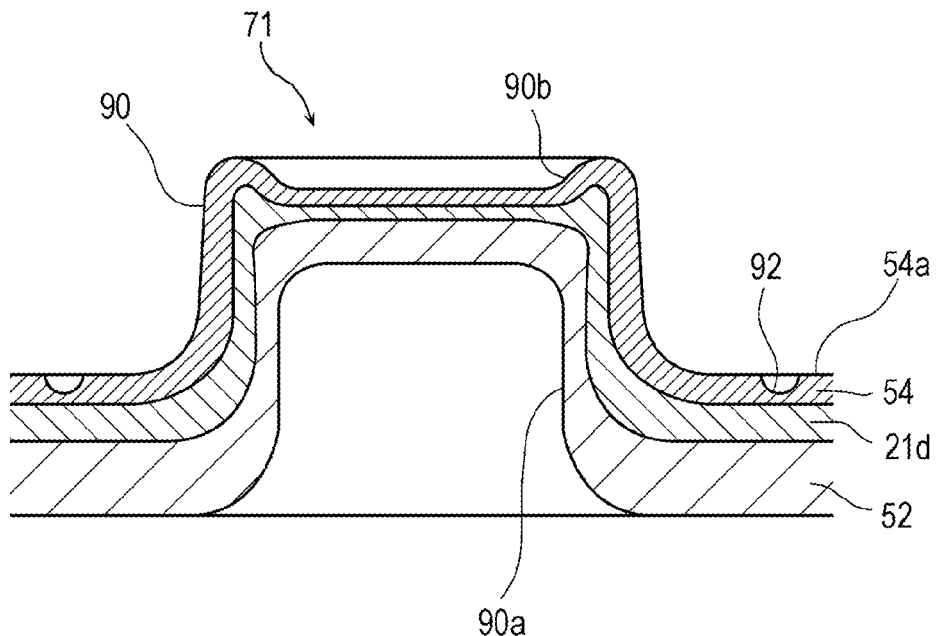
FIG. 16A is a cross-sectional view of the joint portion shown in FIG. 15 as viewed in a direction XVI showing a cross section taken along a radial direction of the swaged joint portion of the joint portion.

As a modification 1 of the energy storage device 100 according to the embodiment, the following configuration can be exemplified. To be more specific, as shown in FIG. 15 and FIG. 16A, in an energy storage device according to the modification 1, on a joint portion of a cover member, a positive electrode current collecting tab group or a negative electrode current collecting tab group, and a positive electrode current collector or a negative electrode current collector, as a rigidity changing part, an annular strip-shaped recessed portion is formed around a swaged joint portion 90 in place of the strip-shaped projection. FIG. 15 is a view showing the modification 1 of the energy storage device 100 according to the embodiment, and is a perspective view showing a modification of the joint portion 71 shown in FIG. 10. FIG. 16A is a cross-sectional view of the joint portion 71 shown in FIG. 15 when a cross section of the joint portion 71 taken along a radial direction of the swaged joint portion 90 of the joint portion 71 is viewed in a direction XVI. The joint portion of the positive electrode current collector and the joint portion of the negative electrode current collector have substantially the same configuration and hence, hereinafter, only the configuration of the joint portion 71 of the second connecting portion 52 of the positive electrode current collector 50, the positive electrode current collecting tab group 21d, and the cover member 54 is described. Further, in the description of the modification made hereinafter, constitutional elements indicated by the same symbols as the reference symbols in the previously described drawings are identical or substantially identical to the corresponding constitutional elements in the previously descried drawings and hence, the detailed description of such constitutional elements is omitted.

With reference to FIG. 15 and FIG. 16A, in the joint portion 71, on an outer surface 54a of the cover member 54, a groove-shaped recessed portion 92 which forms an annular strip-shaped recessed portion and is recessed from the outer surface 54a is formed. The groove-shaped recessed portion 92 is a continuous annular groove which surrounds the swaged joint portion 90 on the flat outer surface 54a of the cover member 54. The groove-shaped recessed portion 92 is made of a material for forming the cover member 54. That is, the groove-shaped recessed portion 92 is a part of the cover member 54. The groove-shaped recessed portion 92 is disposed on the side of the swaged joint portion 90 on the outer surface 54a of the cover member 54. In this modification, although the groove-shaped recessed portion 92 is disposed at a position away from the swaged joint portion 90, the groove-shaped recessed portion 92 may be disposed on a base portion of the swaged joint portion 90.

The groove-shaped recessed portion 92 may be formed simultaneously at the time of manufacturing the cover member 54, may be formed by applying working such as press working after manufacturing the cover member 54, or may be formed at the time of swaging by using the die tool 81 and the punching tool 82. When the groove-shaped recessed portion 92 is formed at the time of swaging, a projection for forming the groove-shaped recessed portion 92 by deforming the cover member 54 may be formed on the receiving surface 81a of the die tool 81 which is brought into contact with the cover member 54. Alternatively, the groove-shaped recessed portion 92 may be formed after swaging by using the die tool 81 and the punching tool 82.

In the cover member 54, a portion where the groove-shaped recessed portion 92 is formed has the smaller cross section than a portion disposed adjacently to the groove-shaped recessed portion 92 on an outer side and hence, the portion where the groove-shaped recessed portion 92 is formed has a lower rigidity than the portion disposed adjacently to the groove-shaped recessed portion 92 on an outer side. Accordingly, when a bending load which intends to peel off the cover member 54 from the second connecting portion 52 is applied to the cover member 54 on an outer side of the groove-shaped recessed portion 92, the cover member 54 is bent at a position of the groove-shaped recessed portion 92 at first thus suppressing occurrence of deformation of the cover member 54 at the inner side of the groove-shaped recessed portion 92. Particularly, the groove-shaped recessed portion 92 extends continuously so as to surround the swaged joint portion 90 over the whole circumference of the swaged joint portion 90 and hence, even when a bending load described above is applied to the cover member 54 from any direction, the deformation of the cover member 54 at the inner side of the groove-shaped recessed portion 92 can be suppressed. Further, also on joint portions 72, 73 and 74, in the same manner as the joint portion 71, the swaged joint portion 90 and the groove-shaped recessed portion 92 are formed.

Figure 16B:
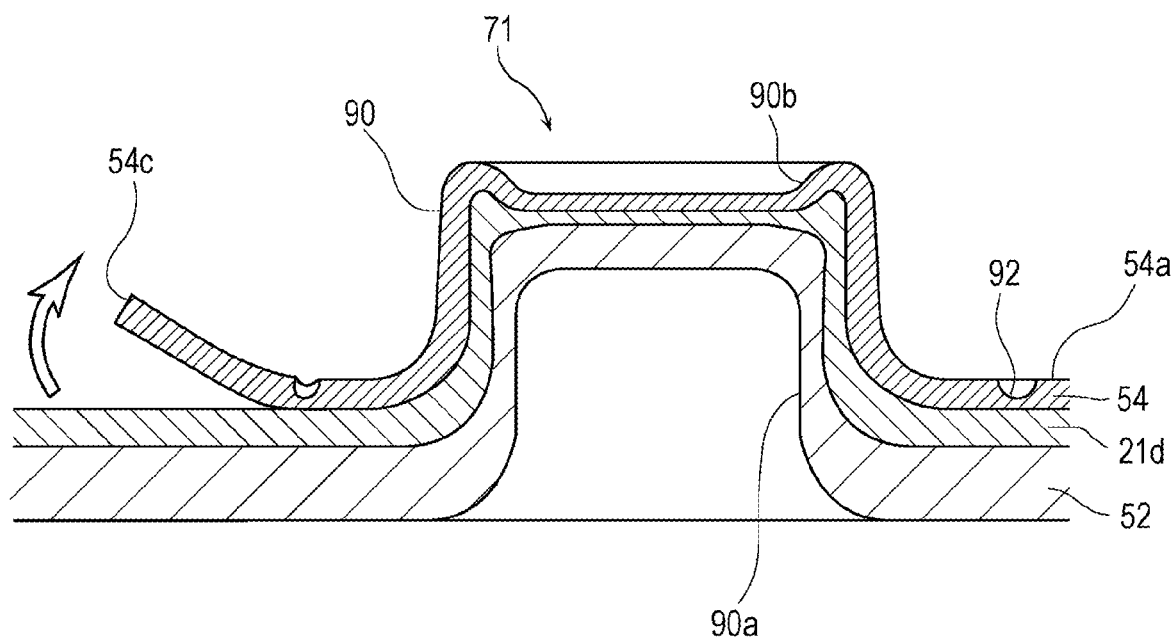
FIG. 16B is a cross-sectional view showing a state of the swaged joint portion when the cover member in FIG. 16A receives a load in a direction that joining by caulking is released.

For example, assume the case shown in FIG. 16B where a load in a direction indicated by a blanked arrow in the drawing which intends to peel off the cover member 54 from the second connecting portion 52 acts on the end portion 54c of the cover member 54. In this case, due to rigidity of the groove-shaped recessed portion 92 which is locally lowered, the deformation of the cover member 54 is suppressed to the groove-shaped recessed portion 92 and the outside of the groove-shaped recessed portion 92. With such lowered rigidity of the groove-shaped recessed portion 92, a stress is concentrated on the groove-shaped recessed portion 92 so that it is possible to suppress the propagation of the stress to the swaged joint portion 90 at the inner side of the groove-shaped recessed portion 92. FIG. 16B is a cross-sectional view showing a state of the swaged joint portion 90 when the cover member 54 in FIG. 16A receives a load in a direction that joining by swaging is released.

Further, other configurations of the energy storage device according to the modification 1 are substantially equal to the corresponding configurations of the energy storage device 100 according to the embodiment and hence, the description of other configurations is omitted. The energy storage device according to the modification 1 can acquire substantially the same advantageous effects as the energy storage device 100 according to the embodiment. In the energy storage device according to the modification 1, the cover member 54 includes the groove-shaped recessed portion 92 as a strip-shaped recessed portion which is recessed from the outer surface 54a of the cover member 54 on a side of the swaged joint portion 90 as the rigidity changing part. With the above-mentioned configuration, at a portion of the cover member 54 where the groove-shaped recessed portion 92 is formed, rigidity of the cover member 54 is lowered. Accordingly, when the cover member 54 receives a bending load at a portion on a side opposite to the swaged joint portion 90 with respect to the groove-shaped recessed portion 92, that is, outside the groove-shaped recessed portion 92, the cover member 54 may be deformed at the groove-shaped recessed portion 92 at first. Therefore, it is possible to suppress the occurrence of deformation on the swaged joint portion 90 due to an action of the bending load. The groove-shaped recessed portion 92 may be formed also on the cover members 55, 64 and 65 in the same manner as the cover member 54, and these groove-shaped recessed portions 92 also can acquire substantially the same advantageous effects as the groove-shaped recessed portion 92 formed on the cover member 54.

In the energy storage device according to the modification 1, the groove-shaped recessed portion 92 is formed on the outer surfaces of the cover members 54, 55, 64 and 65 respectively. However, the present invention is not limited to such a configuration. The groove-shaped recessed portion 92 may be disposed at substantially the same place as the place where the above-mentioned strip-shaped projection 91 is disposed. To be more specific, the groove-shaped recessed portion 92 may be formed on inner surfaces of the cover members 54, 55, 64 and 65 on a side opposite to the outer surfaces of the cover members 54, 55, 64 and 65, or the groove-shaped recessed portion 92 may be formed on the outer surfaces and the inner surfaces of the cover members 54, 55, 64 and 65 respectively. Further, the groove-shaped recessed portion 92 may be formed on the second connecting portion 52 and the third connecting portion 53 of the positive electrode current collector 50 and on the second connecting portion 62 and the third connecting portion 63 of the negative electrode current collector 60 without being formed on the cover members 54, 55, 64 and 65, or in addition to the cover members 54, 55, 64 and 65. In this case, the groove-shaped recessed portion 92 may be formed on one surface of the second connecting portion and one surface of the third connecting portion. Alternatively, the groove-shaped recessed portion 92 may be formed on two surfaces of the second connecting portion and two surfaces of the third connecting portion at positions opposite to each other. Further, when the groove-shaped recessed portion 92 is formed on the cover members, the second connecting portion and the third connecting portion, the positions of the groove-shaped recessed portion 92 may be aligned with each other or may differ from each other in the stacking direction of the cover member and the second connecting portion and in the stacking direction of the cover member and the third connecting portion. The same goes for groove-shaped recessed portions 92a, 92b described later.

Figure 17:
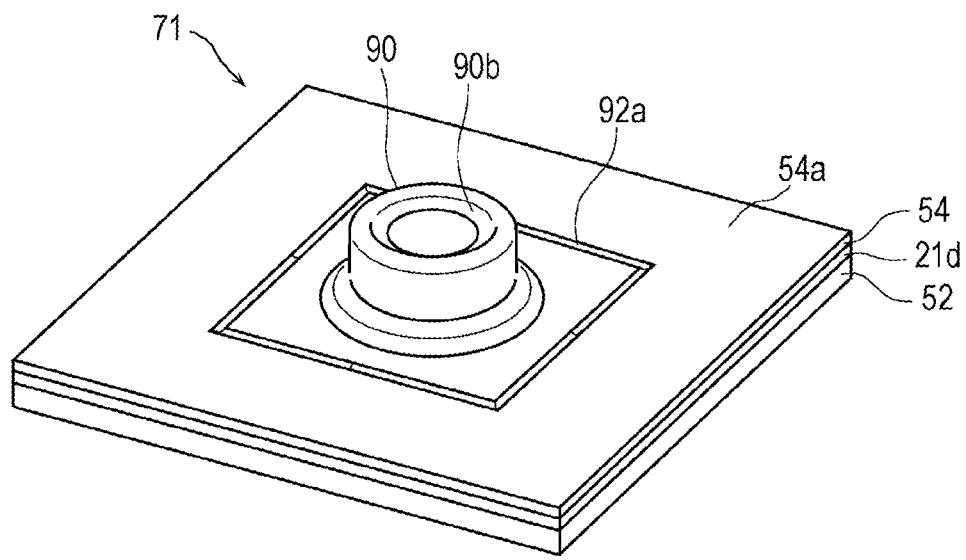
FIG. 17 is a perspective view showing another example of a groove-shaped recessed portion of the joint portion shown in FIG. 15.

In the energy storage device according to the modification 1, the groove-shaped recessed portion 92 which forms the rigidity changing part has a continuous annular planar shape. However, the groove-shaped recessed portion 92 is not limited to such a shape, and may have any shape. The rigidity changing part formed of a recessed portion may be formed of a plurality of recessed portions which are arranged in a divided annular shape. In this case, each of the plurality of recessed portions may be formed of a groove-shaped recessed portion and/or a dot-like recessed portion. Further, a planar shape of the rigidity changing part formed of a recessed portion may be any shape such as a linear line segment, a curved line segment, an elliptical shape, an elongated circular shape, a polygonal shape, or a combination of these shapes. For example, as shown in FIG. 17 which shows another example of the groove-shaped recessed portion 92 of the joint portion 71 shown in FIG. 15, the groove-shaped recessed portion may be a groove-shaped recessed portion 92a having a rectangular planar shape which surrounds the swaged joint portion 90 on the outer surface 54a of the cover member 54. Such a groove-shaped recessed portion 92a can also acquire substantially the same advantageous effects as the advantageous effects of the annular groove-shaped recessed portion 92.

Figure 18:
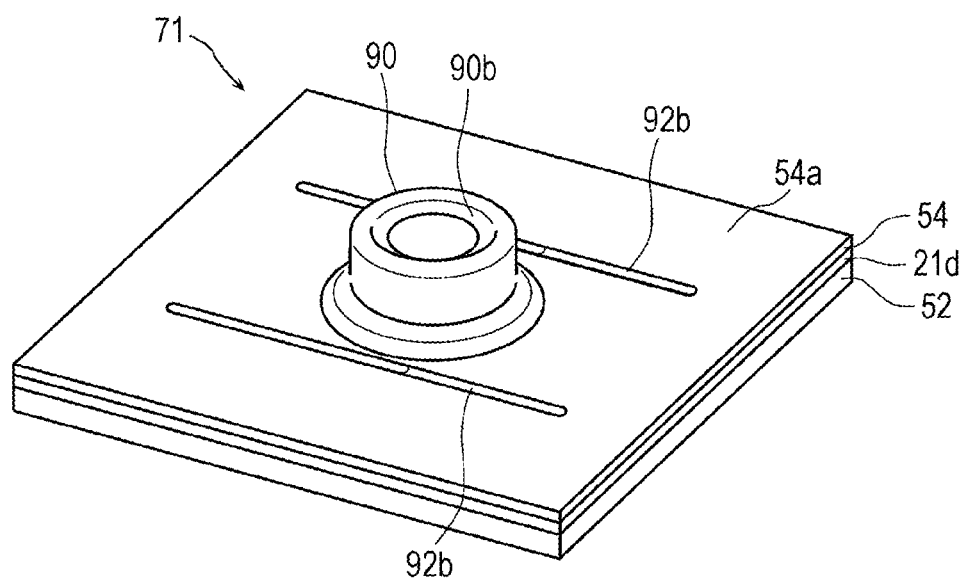
FIG. 18 is a perspective view showing still another example of the groove-shaped recessed portion of the joint portion shown in FIG. 15.

In the energy storage device according to the modification 1, it is sufficient for the rigidity changing part formed of a recessed portion that the rigidity changing part be merely disposed between a portion of the cover member 54, 55, 64 and 65 to which a bending load is expected to be applied and the swaged joint portion 90. With such a configuration, the rigidity changing part can suppress transmission of the bending load to the cover member 54, 55, 64 or 65 of the swaged joint portion 90. For example, as show in FIG. 18 which shows still another example of the groove-shaped recessed portion 92 of the joint portion 71 shown in FIG. 15, the rigidity changing parts respectively formed of a groove-shaped recessed portion may be formed of two linear groove-shaped recessed portions 92b. The groove-shaped recessed portions 92b can be disposed in the same manner as the strip-shaped projections 91b shown in FIG. 14. When a cover member 54 receives a bending load at a portion outside the groove-shaped recessed portion 92b, the cover member 54 is bent at the groove-shaped recessed portion 92b at first. With such a configuration, occurrence of deformation of the cover member 54 at the swaged joint portion 90 can be suppressed. With the use of the groove-shaped recessed portions 92b having a linear shape, the cover member 54 is easily bendable compared to the case where the groove-shaped recessed portion 92 having an annular shape is used. Further, with the use of the groove-shaped recessed portions 92b which extend in a largely projecting manner from both sides of the swaged joint portion 90, an influence which the deformation of the cover member 54 exerts on the swaged joint portion 90 can be suppressed to a low level.

It is preferable that the rigidity changing part formed of the recessed portion be, as in the case of this modification, formed around the swaged joint portion by clinching swaging or the like. For example, when the rigidity changing part formed of the recessed portion is formed around the joint portion using ultrasonic welding, there is a possibility that breaking such as cracks or fractures occur in the member at the recessed portion due to ultrasonic vibrations at the time of welding.

[Modification 2]

Figure 19:
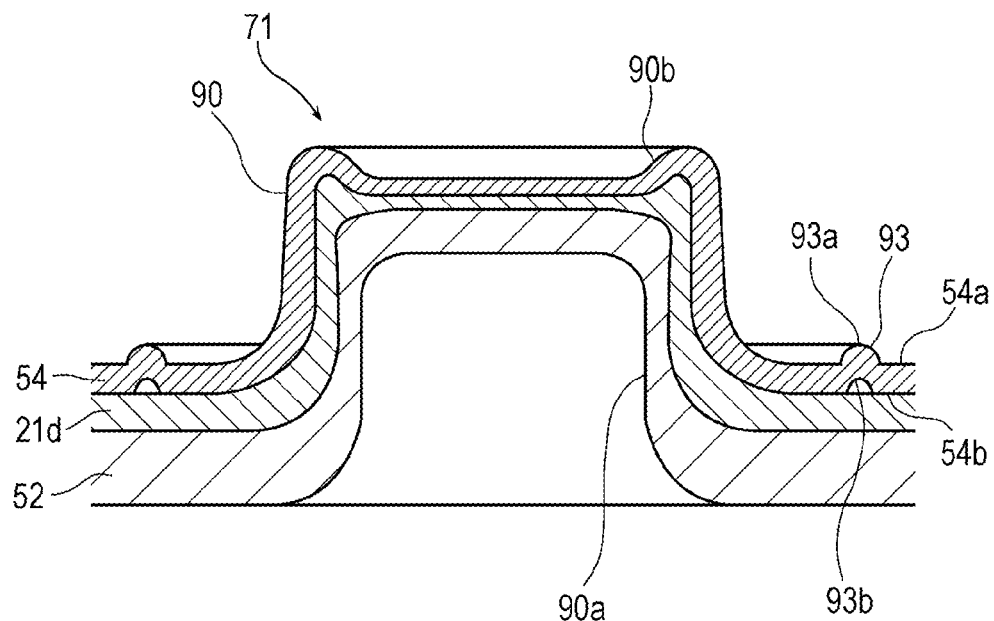
FIG. 19 is a view showing a modification 2 of the energy storage device according to the embodiment, and is a cross-sectional view showing another modification of the joint portion shown in FIG. 11A.

As a modification 2 of the energy storage device 100 according to the embodiment, following configuration can be exemplified. To be more specific, as shown in FIG. 19, in an energy storage device according to the modification 2, on a joint portion of a cover member, a positive electrode current collecting tab group or a negative electrode current collecting tab group, and a positive electrode current collector or a negative electrode current collector, as a rigidity changing part, an annular strip-shaped projection and an annular strip-shaped recessed portion are formed at a position where the annular strip-shaped projection and the annular strip-shaped recessed portion face each other around the swaged joint portion 90. FIG. 19 is a view showing the modification 2 of the energy storage device 100 according to the embodiment, and is a cross-sectional view showing another modification of the joint portion 71 shown in FIG. 11A.

With reference to FIG. 19, in the joint portion 71, on an outer surface 54a of a cover member 54, a strip-shaped projection 93a which projects from the outer surface 54a is formed, and on an inner surface 54b of the cover member 54 on a side opposite to the outer surface 54a, a groove-shaped recessed portion 93b which is recessed from the inner surface 54b is formed. The strip-shaped projection 93a and the groove-shaped recessed portion 93b respectively have a continuous annular shape so as to surround a base portion of the swaged joint portion 90. The strip-shaped projection 93a and the groove-shaped recessed portion 93b are disposed at the position where the strip-shaped projection 93a and the groove-shaped recessed portion 93b face each other with the cover member 54 sandwiched therebetween. That is, the groove-shaped recessed portion 93b is positioned on a back side of the strip-shaped projection 93a. The groove-shaped recessed portion 93b has a planar shape which follows a planar shape of the strip-shaped projection 93a, and has a recessed cross-sectional shape which follows a projecting cross-sectional shape of the strip-shaped projection 93a.

The strip-shaped projection 93a and the groove-shaped recessed portion 93b are made of a material for forming the cover member 54. The strip-shaped projection 93a and the groove-shaped recessed portion 93b can be formed by partially bending the cover member 54 so as to have a U shape or an S shape in cross section. Accordingly, the strip-shaped projection 93a and the groove-shaped recessed portion 93b form an annular bent portion 93 of the cover member 54. In this embodiment, the strip-shaped projection 93a and the groove-shaped recessed portion 93b are disposed at a position away from the swaged joint portion 90. However, the strip-shaped projection 93a and the groove-shaped recessed portion 93b may be disposed on the base portion of the swaged joint portion 90. The strip-shaped projection 93a and the groove-shaped recessed portion 93b may be formed simultaneously at the time of manufacturing the cover member 54, or may be formed by applying working such as press working after manufacturing of the cover member 54.

In the cover member 54, a portion where the strip-shaped projection 93a and the groove-shaped recessed portion 93b are formed or a portion in the vicinity of the portion where the strip-shaped projection 93a and the groove-shaped recessed portion 93b are formed have the lower rigidity than a flat portion around the above-mentioned portions. Accordingly, when a bending load which intends to peel off the cover member 54 from the second connecting portion 52 is applied to the cover member 54 outside the strip-shaped projection 93a and the groove-shaped recessed portion 93b, the cover member 54 is bent at the portion where the strip-shaped projection 93a and the groove-shaped recessed portion 93b are formed or at the portion in the vicinity of the portion where the strip-shaped projection 93a and the groove-shaped recessed portion 93b are formed at first thus suppressing the occurrence of deformation at the inner side of the strip-shaped projection 93a and the groove-shaped recessed portion 93b. Further, also on the joint portions 72, 73 and 74, in the same manner as the joint portion 71, the swaged joint portion 90, the strip-shaped projection 93a, and the groove-shaped recessed portion 93b are formed.

Other configurations of the energy storage device according to the modification 2 are substantially equal to the corresponding configurations of the energy storage device 100 according to the embodiment and hence, the description of other configurations is omitted. Further, the energy storage device according to the modification 2 can acquire substantially the same advantageous effects as the energy storage device 100 according to the embodiment. In the energy storage device according to the modification 2, the groove-shaped recessed portion 93b of the cover member 54 is positioned on the cover member 54 at the position opposite to the strip-shaped projection 93a, and extends along the strip-shaped projection 93a. In the above-mentioned configuration, the strip-shaped projection 93a and the groove-shaped recessed portion 93b can be formed by bending the cover member 54 and hence, the strip-shaped projection 93a and the groove-shaped recessed portion 93b can be easily formed. Further, also on the cover members 55, 64 and 65, the strip-shaped projection 93a and the groove-shaped recessed portion 93b may be formed in the same manner as the cover member 54. The strip-shaped projection 93a and the groove-shaped recessed portion 93b formed on each of the respective cover members 55, 64 and 65 also can acquire substantially the same advantageous effects as the strip-shaped projection 93a and the groove-shaped recessed portion 93b formed on the cover member 54.

In the energy storage device according to the modification 2, the groove-shaped recessed portion 93b formed on the cover member 54, 55, 64 and 65 is disposed on a back side of the strip-shaped projection 93a. However, the present invention is not limited to such a configuration, and the groove-shaped recessed portion 93b may be disposed at a position displaced from the back side of the strip-shaped projection 93a.

In the energy storage device according to the modification 2, the strip-shaped projection 93a is formed on the outer surface of the cover member 54, 55, 64 or 65, and the groove-shaped recessed portion 93b is formed on the inner surface of the cover member 54, 55, 64 or 65. However, the present invention is not limited to such a configuration. The strip-shaped projection 93a may be formed on the inner surface of the cover member 54, 55, 64 or 65, and the groove-shaped recessed portion 93b may be formed on the outer surface of the cover member 54, 55, 64 or 65. The strip-shaped projection 93a and the groove-shaped recessed portion 93b may be formed on the second connecting portion 52 and the third connecting portion 53 of the positive electrode current collector 50 and on the second connecting portion 62 and the third connecting portion 63 of the negative electrode current collector 60 without being formed on the cover members 54, 55, 64 and 65, or in addition to the cover members 54, 55, 64 and 65. In this case, the strip-shaped projection 93a and the groove-shaped recessed portion 93b may be formed on either one of a surface facing the cover member and a surface opposite to the cover member in the second connecting portion and the third connecting portion. Further, when the strip-shaped projection 93a and the groove-shaped recessed portion 93b are formed on the cover members, the second connecting portion and the third connecting portion, the positions of the strip-shaped projection 93a and the groove-shaped recessed portion 93b may be aligned with each other or may differ from each other in the stacking direction of the cover member and the second connecting portion and the stacking direction of the cover member and the third connecting portion.

The arrangement and the shapes of the strip-shaped projection 93a and the groove-shaped recessed portion 93b are not limited to the arrangement and the shapes described in this modification. The arrangement and the shapes of the strip-shaped projection 93a and the groove-shaped recessed portion 93b may be substantially equal to the arrangement and the shapes of the strip-shaped projection and the groove-shaped recessed portion described in the embodiment and the modification 1.

[Modification 3]

Figure 20:
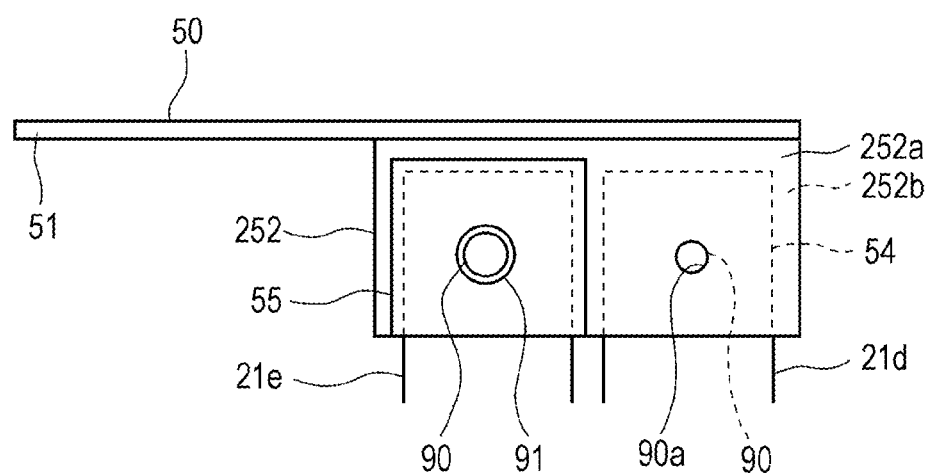
FIG. 20 is a view showing a modification 3 of the energy storage device according to the embodiment, and is a side view showing a modification of the positive electrode current collector shown in FIG. 12.

As a modification 3 of the energy storage device 100 according to the embodiment, following configuration can be exemplified. To be more specific, as shown in FIG. 20, an energy storage device according to the modification 3 is configured such that one connecting portion of each of the positive electrode current collector 50 and the negative electrode current collector 60 is connected to two positive electrode current collecting tab groups 21*d*, 21*e* or two negative electrode current collecting tab groups 22*d*, 22*e* of an electrode assembly 20. FIG. 20 is a view showing the modification 3 of the energy storage device 100 according to the embodiment, and is a side view showing a modification of the positive electrode current collector 50 shown in FIG. 12. The positive electrode current collector 50 and the negative electrode current collector 60 have substantially the same configuration and hence, only the positive electrode current collector 50 is described hereinafter.

With reference to FIG. 3 and FIG. 20, a positive electrode current collector 50 includes a plate-like first connecting portion 51 connected to a shaft portion 30*b* of a positive electrode terminal 30, and a plate-like fourth connecting portion 252 projecting from the first connecting portion 51 as integral parts thereof. The positive electrode current collector 50 of this modification does not include the second connecting portion 52 and the third connecting portion 53.

The fourth connecting portion 252 extends continuously from the first connecting portion 51 in a direction intersecting the first connecting portion 51. The fourth connecting portion 252 has two flat wide surfaces 252*a*, 252*b* disposed at positions opposite to each other. The fourth connecting portion 252 extends between the positive electrode current collecting tab group 21*d* and the positive electrode current collecting tab group 21*e*. A surface 252*a* of the fourth connecting portion 252 faces the positive electrode current collecting tab group 21*e* and, at the same time, is disposed adjacently to the positive electrode current collecting tab group 21*e*. A surface 252*b* of the fourth connecting portion 252 faces the positive electrode current collecting tab group 21*d* and, at the same time, is disposed adjacently to the positive electrode current collecting tab group 21*d*.

The positive electrode current collecting tab group 21*d* is sandwiched between the surface 252*b* of the fourth connecting portion 252 and the cover member 54, and is swaged together with the fourth connecting portion 252 and the cover member 54. With such a configuration, the positive electrode current collecting tab group 21*d* is connected to the fourth connecting portion 252. The positive electrode current collecting tab group 21*e* is sandwiched between the surface 252*a* of the fourth connecting portion 252 and the cover member 55, and is swaged together with the fourth connecting portion 252 and the cover member 55. With such a configuration, the positive electrode current collecting tab group 21*e* is connected to the fourth connecting portion 252. That is, two positive electrode current collecting tab groups 21*d*, 21*e* are connected to one fourth connecting portion 252. The swaged joint portion 90 which is formed on the cover member 54 accompanied with the strip-shaped projection 91 disposed around the cover member 54 and the swaged joint portion 90 which is formed on the cover member 55 accompanied with the strip-shaped projection 91 disposed around the cover member 55 project in directions opposite to each other with respect to the fourth connecting portion 252. That is, the swaged joint portion 90 of the cover member 54 projects from the positive electrode current collecting tab group 21*d* toward the cover member 54, and the swaged joint portion 90 of the cover member 55 projects from the positive electrode current collecting tab group 21*e* toward the cover member 55. Further, in the same manner as the positive electrode current collector 50, also the negative electrode current collector 60 includes a fourth connecting portion to which two negative electrode current collecting tab groups 22*d*, 22*e* are connected.

Other configurations of the energy storage device according to the modification 3 are substantially equal to the corresponding configurations of the energy storage device 100 according to the embodiment and hence, the description of other configurations is omitted. The energy storage device according to the modification 3 can acquire substantially the same advantageous effects as the energy storage device 100 according to the embodiment. In the energy storage device according to the modification 3, the positive electrode current collector 50 includes the fourth connecting portion 252 disposed between two positive electrode current collecting tab groups 21*d*, 21*e*, and the negative electrode current collector 60 includes the fourth connecting portion disposed between two negative electrode current collecting tab groups 22*d*, 22*e*. Further, a set of the fourth connecting portion 252 of the positive electrode current collector 50 and the positive electrode current collecting tab group 21*d* and a set of the fourth connecting portion 252 of the positive electrode current collector 50 and the positive electrode current collecting tab group 21*e* respectively have the swaged joint portion 90 which projects from one of the fourth connecting portion 252 or the positive electrode collecting tab group 21*d*, 21*e* to the other of the fourth connecting portion 252 or the positive electrode collecting tab group 21*d*, 21*e*.

In the same manner, a set of the fourth connecting portion of the negative electrode current collector 60 and the negative electrode current collecting tab group 22*d* and a set of the fourth connecting portion of the negative electrode current collector 60 and the negative electrode current collecting tab group 22*e* respectively have the swaged joint portion 90 which projects from one of the fourth connecting portion or the positive electrode collecting tab group 22*d*, 22*e* to the other of the fourth connecting portion or the positive electrode collecting tab group 22*d*, 22*e*. In the above-mentioned configuration, in the case where the plurality of positive electrode current collecting tabs 21*c* are divided into two positive electrode current collecting tab groups 21*d*, 21*e* which are disposed on both sides of the fourth connecting portion 252 of the positive electrode current collector 50 respectively, the positive electrode current collecting tab groups 21*d*, 21*e* can be joined to the fourth connecting portion 252 by swaging from both sides in a state where the positive electrode current collecting tab groups 21*d*, 21*e* sandwich the fourth connecting portion 252 therebetween. Accordingly, the positive electrode current collecting tab groups 21*d*, 21*e* can be easily joined to each other by swaging. Also the fourth connecting portion of the negative electrode current collector 60 and the negative electrode current collecting tab groups 22*d*, 22*e* can acquire substantially the same advantageous effects as the above-mentioned advantageous effects.

In the energy storage device according to the modification 3, the strip-shaped projection 91 is formed around the swaged joint portion 90. However, the present invention is not limited to such a configuration, and the groove-shaped recessed portion 92 may be formed around the swaged joint portion 90, or both the strip-shaped projection 93a and the groove-shaped recessed portion 93b may be formed around the swaged joint portion 90.

In the energy storage device according to the modification 3, two positive electrode current collecting tab groups or two negative electrode current collecting tab groups are connected to one fourth connecting portion of the positive electrode current collector 50 or the negative electrode current collector 60. However, three or more positive electrode current collecting tab groups or three or more negative electrode current collecting tab groups may be connected to one fourth connecting portion.

[Other Modification]

The energy storage devices according to the embodiment and the modifications of the present invention have been described heretofore. However, the present invention is not limited to such embodiment and modifications. That is, it should be construed that the embodiment and the modifications disclosed in this specification are provided for an exemplifying purpose and are not limitative in all aspects. The scope of the present invention is not defined by the above-mentioned description and is defined by the scope of Claims, and it is intended that all alternations which are equivalent to the scope of claim in meaning and range are included in the scope of the present invention.

In the energy storage devices according to the embodiment and the modifications, two positive electrode current collecting tab groups 21d, 21e and two negative electrode current collecting tab groups 22d, 22e are disposed at the end portion 20a of the electrode assembly 20. However, the arrangement of these current collecting tab groups is not limited to such an arrangement. One positive electrode current collecting tab group may be disposed on the end portion 20a of the electrode assembly 20 or three or more positive electrode current collecting tab groups may be disposed on the end portion 20a of the electrode assembly 20. In the same manner, one negative electrode current collecting tab group may be disposed on the end portion 20a or three or more negative electrode current collecting tab groups may be disposed on the end portion 20a. Further, the positive electrode current collecting tab group and the negative electrode current collecting tab group may be disposed on both end portions 20a and 20b of the electrode assembly 20. In this case, the positive electrode current collecting tab group may be disposed on only one or both of the end portions 20a and 20b of the electrode assembly 20, and the negative electrode current collecting tab group may be disposed on only the other or both of the end portions 20a and 20b of the electrode assembly 20.

In the above-mentioned configuration, the positive electrode current collector and the negative electrode current collector have connecting portions the number of which corresponds to the number of positive electrode current collecting tab groups and the number of negative electrode current collecting tab groups. One positive electrode current collecting tab group or one negative electrode current collecting tab group may be connected to one connecting portion. Alternatively, two or more positive electrode current collecting tab groups or two or more negative electrode current collecting tab groups may be connected to one connecting portion. Further, all positive electrode current collecting tab groups or negative electrode current collecting tab groups may be connected to one connecting portion.

In the energy storage devices according to the embodiment and the modifications, the swaged joint portion 90 connects the positive electrode current collector 50 and the positive electrode current collecting tab groups 21d, 21e of the electrode assembly 20, and connects the negative electrode current collector 60 and the negative electrode current collecting tab groups 22d and 22e of the electrode assembly 20. However, the swaged joint portion 90 is not limited to such a configuration. The positive electrode current collector 50 and the negative electrode current collector 60 may include a conductive lead plate which forms an additional member as a constitutional element thereof, and the swaged joint portion 90 may connect the lead plate which is connected to the positive electrode current collector 50 and the positive electrode current collecting tab groups 21d, 21e to each other. The swaged joint portion 90 may connect a lead plate which is connected to the negative electrode current collector 60 and the negative electrode current collecting tab groups 22d, 22e to each other. Further, the positive electrode current collector 50 and the negative electrode current collector 60 may be joined to the lead plates by a joining method such as welding.

In the energy storage devices according to the embodiment and the modifications, in the positive electrode current collector 50 and the negative electrode current collector 60, the second connecting portions 52, 62 and the third connecting portions 53, 63 extend substantially perpendicular to the first connecting portions 51, 61. However, the direction that the second connecting portions 52, 62 and the third connecting portions 53, 63 extend is not limited to such a direction. In the same manner, the fourth connecting portion extends substantially perpendicular to the first connecting portion. However, the extending direction of the fourth connecting portion is not limited to such a direction. For example, the second connecting portions 52, 62 and the third connecting portions 53, 63 may extend along the first connecting portions 51, 61, and the fourth connecting portion may extend along the first connecting portion. In this case, the second connecting portion, the third connecting portion and the fourth connecting portion which extend substantially perpendicular to the first connecting portion may be bent so as to extend along the first connecting portion after the formation of swaged joint portions 90. The swaged joint portions 90 of the bent second connecting portion, third connecting portion and fourth connecting portion may project toward the positive electrode terminal 30 or the negative electrode terminal 40 but not projecting toward the electrode assembly 20. With such a configuration, it is possible to suppress the occurrence of a phenomenon that the swaged joint portion 90 is brought into contact with the electrode assembly 20 so that the positive electrode plate 21 and the negative electrode plate 22 are deformed and the separator 23 is broken whereby the positive electrode plate 21 and the negative electrode plate 22 are short-circuited with each other. In the case where the swaged joint portions 90 project as described above, two swaged joint portions 90 in the fourth connecting portion may project in the similar directions.

In the energy storage devices according to the embodiment and the modifications, the swaged joint portion 90 is formed into a bottomed circular cylindrical shape by a die tool 81 and a punching tool 82. However, the swaged joint portion 90 is not limited to such a shape. The swaged joint portion 90 may be formed such that swaging is performed by using the die tool 81 and the punching tool 82 and, thereafter, the swaged joint portion 90 may be deformed in a collapsed manner by receiving a pressing pressure of the bottom portion which forms a projecting end of the die tool 81. With such a configuration, the respective members which form the swaged joint portion 90 are deformed such that the respective members entangle with each other and hence, a joining strength between the members is enhanced. Further, the swaged joint portion 90 may not be completely collapsed and may project from the cover member. With such a configuration, the swaged joint portion 90 can maintain the stereoscopic structure and hence, a joining strength at the swaged joint portion 90 is further enhanced.

In the energy storage devices according to the embodiment and the modifications, the electrode assembly 20 includes the positive electrode current collecting tab groups 21*d*, 21*e* and the negative electrode current collecting tab groups 22*d*, 22*e*. However, the electrode assembly 20 may include neither the positive electrode current collecting tab groups 21*d*, 21*e* nor the negative electrode current collecting tab groups 22*d*, 22*e*. For example, the electrode assembly 20 may include a positive electrode active material layer non-forming portion where a positive electrode base material is exposed because of non-forming of a positive electrode active material layer on an edge 21*a* of the positive electrode plate 21, and the electrode assembly 20 may include a negative electrode active material layer non-forming portion where a negative electrode base material is exposed because of non-forming of a negative electrode active material layer on an edge 22*b* of the negative electrode plate 22. In this case, the swaged joint portion may connect the positive electrode active material layer non-forming portion and the positive electrode current collector to each other, and the swaged joint portion may connect the negative electrode active material layer non-forming portion and the negative electrode current collector to each other.

In the energy storage devices according to the embodiment and the modifications, the rigidity changing parts which are formed of the strip-shaped projections 91, 91*a* and 91*b*, the groove-shaped recessed portions 92, 92*a* and 92*b* and the bent portion 93 respectively are disposed at the joint portions of positive electrode current collecting tab groups 21*d*, 21*e* and the positive electrode current collector 50, and the joint portions of negative electrode current collecting tab groups 22*d*, 22*e* and the negative electrode current collector 60 respectively. However, portions where the rigidity changing part is formed are not limited to such portions. The rigidity changing part may be disposed at a joint portion between any members. For example, the rigidity changing part may be disposed at the joint portion of a positive electrode active material layer non-forming portion of the electrode assembly 20 and the positive electrode current collector and at the joint portion of a negative electrode active material layer non-forming portion and the negative electrode current collector.

In the energy storage devices according to the embodiment and the modifications, the swaged joint portion 90 is applied to the connections between the electrode assembly 20 and the positive electrode current collector 50 and the negative electrode current collector 60. However, the swaged joint portion 90 is not limited to such an application, and may be applied to the connection of two or more members having electrical conductivity.

In the energy storage devices according to the embodiment and the modifications, the electrode assembly 20 is a winding type electrode assembly which is formed by winding the positive electrode plate, the negative electrode plate and the separators overlapped with each other. However, the electrode assembly 20 is not limited to such a winding-type electrode assembly. The electrode assembly may be a stack-type electrode assembly formed by making a large number of positive electrode plates, negative electrode plates and separators overlapped with each other or a z-type electrode assembly formed by bending plural times one set or two or more sets of a positive electrode plate, a negative electrode plate and separators overlapped with each other.

Each of the energy storage devices according to the embodiment and the modifications includes one electrode assembly 20. However, the energy storage device may include two or more electrode assemblies.

Each of the energy storage devices according to the embodiment and the modifications includes the horizontally-winding-type electrode assembly 20. However, the energy storage device may include a vertically-winding-type electrode assembly where the electrode assembly is disposed in a direction where a winding axis A extends along a lid body 12 of the container 10.

In the energy storage devices according to the embodiment and the modifications, the positive electrode terminal 30 and the positive electrode current collector 50 are formed as separate bodies from each other, and the negatives electrode terminal 40 and the negative electrode current collector 60 are formed as separate bodies from each other. However, the electrode terminal and the electrode current collector are not limited to such a configuration. The positive electrode terminal 30 and the positive electrode current collector 50 may be formed as an integral body, and the negative electrode terminal 40 and the negatives electrode current collector 60 may be formed as an integral body. In this case, the upper insulating member 31 and the lower insulating member 32 may be integrally formed with the lid body 12, the positive electrode terminal 30 and the positive electrode current collector 50 by an integrally forming method such as insert molding. In the same manner, the upper insulating member 41 and the lower insulating member 42 may be integrally formed with the lid body 12, the negative electrode terminal 40 and the negative electrode current collector 60 by an integrally forming method such as insert molding.

The energy storage devices according to the present invention which are exemplified in the embodiment and the modifications may be used as relatively large secondary batteries. A discharge capacity of such a relatively large secondary battery is preferably 3 Ah (ampere hour) or more, is more preferably 10 Ah or more, is further more preferably 20 Ah or more, and is still further more preferably 30 Ah or more. Such an energy storage device is applicable to, for example, a vehicle-use power source for an electric vehicle (EV), a hybrid electric vehicle (HEV) or a plug-in hybrid electric vehicle (PHEV), an electric storage power source such as an uninterruptible power supply device as a back-up device or a photovoltaic power system and the like.

The present invention also includes the configuration which is formed by arbitrarily combining the embodiment and the modifications. Further, the present invention can be realized not only as the above-mentioned energy storage device but also in an energy storage apparatus which includes at least one energy storage device. For example, the present invention can be realized as the energy storage apparatus which includes the plurality of energy storage devices 100. The energy storage apparatus includes a plurality of energy storage units arranged parallel to each other, and each energy storage unit is formed of a plurality of energy storage devices 100 which are arranged in a row and are electrically connected to each other, for example. With such a configuration, the plurality of energy storage devices 100 are used as a single unit, and the number and the arrangement of the energy storage units can be selected corresponding to an electric capacity necessary for the energy storage apparatus, a shape and a size of the energy storage apparatus and the like. The energy storage apparatus which includes the plurality of energy storage devices 100 and generates a high output can be also mounted as a vehicle-use power source as described previously. Further, the energy storage apparatus which includes the plurality of energy storage devices 100 and generates a high output may be used not only as a power source for an automobile but also as a power source for an automated guided vehicle (AGV) or an electrically-driven movable body such as an electric train.

The present invention is applicable to an energy storage device such as a lithium ion secondary battery.

What is claimed is:

1. An energy storage device comprising a first member and a second member having electric conductivity and joined to each other,
    wherein the energy storage device further comprises a joint portion which joins the first member and the second member to each other, the first member and the second member being engaged with each other by fitting engagement by a concavo-convex structure which projects from the first member toward the second member,
    wherein at least one of the first member and the second member includes a rigidity changing part in a vicinity of the joint portion, and
    wherein the rigidity changing part is disposed at a position away from a base portion of the joint portion.

2. The energy storage device according to claim 1, wherein the rigidity changing part includes a strip-shaped projection projecting from a surface in the vicinity of the joint portion of at least one of the first member and the second member.

3. The energy storage device according to claim 1, wherein the rigidity changing part includes a strip-shaped recessed portion recessed from a surface in the vicinity of the joint portion of at least one of the first member and the second member.

4. The energy storage device according to claim 2, wherein the rigidity changing part further includes a strip-shaped recessed portion recessed from a surface in the vicinity of the joint portion of at least one of the first member and the second member, and
    wherein the strip-shaped recessed portion is positioned on a side opposite to the projection formed on at least one of the first member and the second member, and extends along the projection.

5. The energy storage device according to claim 1, wherein, in the joint portion, both the first member and the second member project in a direction from the first member toward the second member in a side of the joint portion, and are recessed in the direction from the first member toward the second member in another side of the joint portion.

6. The energy storage device according to claim 1, wherein an electrode plate is sandwiched between the first member and the second member.

7. The energy storage device according claim 6, wherein the first member comprises a current collector, the second member comprises a cover member of the electrode plate, and
    wherein a thickness of the second member is less than a thickness of the first member.

8. The energy storage device according to claim 1, wherein a flat surface of the at least one of the first member and the second member extends between the rigidity changing part and the base portion of the joint portion.

9. The energy storage device according to claim 1, wherein a thickness of the at least one of the first member and the second member at the rigidity changing part is different from a thickness of a remaining portion of the at least one of the first member and the second member.

10. The energy storage device according to claim 1, wherein a thickness of the at least one of the first member and the second member at the rigidity changing part is less than a thickness of a remaining portion of the at least one of the first member and the second member.

11. The energy storage device according to claim 1, wherein the base portion of the joint portion is located at a bottom section of the concavo-convex structure.

* * * * *